US010805455B2

(12) United States Patent
Rauenbuehler et al.

(10) Patent No.: US 10,805,455 B2
(45) Date of Patent: Oct. 13, 2020

(54) CALL MANAGEMENT BETWEEN MULTIPLE USER DEVICES

(71) Applicant: Apple Inc., Cupertino, CA (US)

(72) Inventors: Keith W. Rauenbuehler, San Francisco, CA (US); Nicholas M. Fraioli, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/845,725

(22) Filed: Dec. 18, 2017

(65) Prior Publication Data

US 2018/0255174 A1 Sep. 6, 2018

Related U.S. Application Data

(63) Continuation of application No. 15/170,705, filed on Jun. 1, 2016, now Pat. No. 9,848,079.

(Continued)

(51) Int. Cl.
H04M 3/42 (2006.01)
H04L 29/08 (2006.01)
(Continued)

(52) U.S. Cl.
CPC ........ *H04M 3/42127* (2013.01); *H04L 67/26* (2013.01); *H04M 3/42263* (2013.01);
(Continued)

(58) Field of Classification Search
CPC ...... H04W 4/80; H04W 68/005; H04W 88/06
See application file for complete search history.

(56) References Cited

U.S. PATENT DOCUMENTS 5,768,356 A 6/1998 McKendry et al.
6,529,136 B2 3/2003 Cao et al.
(Continued)

FOREIGN PATENT DOCUMENTS

CN 149306 A 4/2004
CN 103391228 A 11/2013
(Continued)

OTHER PUBLICATIONS

International Patent Application No. PCT/US2016/035194—International Search Report and Written Opinion dated Aug. 31, 2016.
(Continued)

*Primary Examiner* — Wen W Huang
(74) *Attorney, Agent, or Firm* — Dickinson Wright RLLP

(57) ABSTRACT

A connection manager manages connections for associated user devices by determining whether an incoming connection has been answered at a user device, and if so then generating and transmitting silencing commands to associated user devices using first and second wireless communication modes, with one mode being faster. Connections can comprise phone calls, and modes can comprise push and Bluetooth® messaging. The connection manager can instruct device outputs to provide connection alerts, limited to visual alerts when an associated user device is active, listen for associated user device communications, and instruct device outputs to stop providing alerts when a silencing command is received. Further, a connection manager can receive a signal regarding a headset status, route an outside connection from a phone to the headset when the headset is active or to another device when the headset is not active, detect a change in headset status, and reroute the connection accordingly.

20 Claims, 12 Drawing Sheets

Related U.S. Application Data

(60) Provisional application No. 62/172,025, filed on Jun. 5, 2015, provisional application No. 62/172,028, filed on Jun. 5, 2015.

(51) Int. Cl.

| | | |
|---|---|---|
| *H04W 76/10* | (2018.01) | |
| *H04W 4/80* | (2018.01) | |
| *H04M 3/54* | (2006.01) | |
| *H04W 84/18* | (2009.01) | |
| *H04M 3/46* | (2006.01) | |
| *H04W 4/06* | (2009.01) | |
| *H04W 68/02* | (2009.01) | |
| *H04W 68/00* | (2009.01) | |
| *H04W 84/04* | (2009.01) | |
| *H04W 84/12* | (2009.01) | |
| *H04W 88/06* | (2009.01) | |

(52) U.S. Cl.
CPC ....... *H04M 3/42365* (2013.01); *H04M 3/465* (2013.01); *H04M 3/543* (2013.01); *H04W 4/06* (2013.01); *H04W 4/80* (2018.02); *H04W 68/02* (2013.01); *H04W 76/10* (2018.02); *H04W 84/18* (2013.01); *H04M 2203/2094* (2013.01); *H04W 68/005* (2013.01); *H04W 84/042* (2013.01); *H04W 84/12* (2013.01); *H04W 88/06* (2013.01)

(56) References Cited

U.S. PATENT DOCUMENTS

| | | | | |
|---|---|---|---|---|
| 8,301,178 | B1 * | 10/2012 | Breau | H04W 68/00 |
| | | | | 370/206 |
| 9,572,184 | B1 * | 2/2017 | Erdogan | H04W 12/06 |
| 9,615,197 | B2 | 4/2017 | Wang et al. | |
| 9,826,089 | B2 | 11/2017 | Rauenbuehler et al. | |
| 9,848,079 | B2 | 12/2017 | Rauenbuehler et al. | |
| 9,973,454 | B2 | 5/2018 | Yang | |
| 2002/0018546 | A1 | 2/2002 | Horne | |
| 2002/0118398 | A1 | 8/2002 | Tanimoto | |
| 2004/0204168 | A1 | 10/2004 | Laurila | |
| 2004/0223479 | A1 | 11/2004 | Vallstrom et al. | |
| 2006/0221943 | A1 | 10/2006 | Aborn et al. | |
| 2008/0107252 | A1 | 5/2008 | Forte | |
| 2008/0248797 | A1 | 10/2008 | Freeman et al. | |
| 2008/0311851 | A1 | 12/2008 | Hansen et al. | |
| 2010/0124947 | A1 | 5/2010 | Sano | |
| 2010/0266114 | A1 | 10/2010 | Fan et al. | |
| 2011/0254684 | A1 * | 10/2011 | Antoci | H04M 1/7253 |
| | | | | 340/539.13 |
| 2013/0339436 | A1 | 12/2013 | Gray | |
| 2014/0315511 | A1 | 10/2014 | Cha et al. | |
| 2015/0245186 | A1 * | 8/2015 | Park | H04W 4/80 |
| | | | | 455/417 |
| 2015/0264723 | A1 * | 9/2015 | Cheng | H04W 48/10 |
| | | | | 455/41.2 |
| 2015/0351074 | A1 * | 12/2015 | Vyas | H04W 68/005 |
| | | | | 455/414.2 |
| 2016/0094437 | A1 | 3/2016 | On | |
| 2016/0286337 | A1 * | 9/2016 | Thekkedathu Sivaraman | |
| | | | | H04M 1/7253 |
| 2017/0094638 | A1 | 3/2017 | Borges et al. | |
| 2017/0289155 | A1 * | 10/2017 | Kerai | H04W 76/10 |

FOREIGN PATENT DOCUMENTS

| | | |
|---|---|---|
| CN | 103634275 A | 3/2014 |
| CN | 104320163 A | 1/2015 |
| CN | 104348697 A | 2/2015 |
| CN | 104902424 A | 9/2015 |
| KR | 1020140049449 A | 4/2014 |
| KR | 1020140077093 A | 6/2014 |
| KR | 101482000 B1 | 1/2015 |
| WO | 2008033607 A2 | 3/2008 |
| WO | 2014000163 A1 | 1/2014 |
| WO | 2014088235 A1 | 6/2014 |
| WO | 2014092441 A1 | 6/2014 |
| WO | 2014170754 A2 | 10/2014 |

OTHER PUBLICATIONS

European Patent Application No. 16191555.8—Extended European Search Report dated Mar. 15, 2017.
Korean Patent Application No. 10-2016-0126364—Notice of Allowance dated Jan. 9, 2018.
Chinese Patent Application No. 201611151885.0—First Office Action dated Mar. 4, 2019.
European Patent application 16804294.3—Extented European Serach Report dated Jan. 2, 2019.
Chinese Patent Application No. 201680031046.7—First Office Action dated Feb. 3, 2020.
Chinese Patent Application No. 201611151885.0—Second Office Action dated Oct. 23, 2019.

* cited by examiner

CALL MANAGEMENT BETWEEN MULTIPLE USER DEVICES

CROSS-REFERENCE TO RELATED APPLICATION

This Application is a continuation of U.S. application Ser. No. 15/170,705, filed Jun. 1, 2016, entitled "CALL MANAGEMENT BETWEEN MULTIPLE USER DEVICES," issued Dec. 17, 2017 as U.S. Pat. No. 9,848,079, which claims the benefit of U.S. Provisional Application No. 62/172,025 filed Jun. 5, 2015, entitled "CALL MANAGEMENT BETWEEN MULTIPLE USER DEVICES," and U.S. Provisional Patent Application No. 62/172,028 filed Jun. 5, 2015, entitled "MULTI-DEVICE CALL NOTIFICATION SILENCING," the contents of which are incorporated by reference herein in their entirety for all purposes.

Moreover, this application is related to: U.S. Non-Provisional patent application Ser. No. 15/170,805 entitled "MULTI-DEVICE CALL NOTIFICATION SILENCING," filed Jun. 1, 2016, issued Nov. 21, 2017 as U.S. Pat. No. 9,826,089, the entire contents of which are incorporated herein by reference.

FIELD

The described embodiments relate generally to communications using electronic devices, including systems and techniques for managing calls between multiple associated user devices.

BACKGROUND

Recent technological advances give rise to situations in which an individual has multiple different active electronic devices, often at the same general location and at the same time. In addition to a smart phone, a user may also simultaneously have a headset, a tablet device, a laptop computer, a desktop computer, a portable media player, and/or one or more other electronic devices, some or all of which may be able to conduct wireless communications.

Oftentimes, a telephone call or other communication may come in to a smart phone of a user while the phone is nearby but not with the user, or when it may be otherwise inconvenient to answer the call on the phone itself. However, the user is unable to take or reject the call through another device. In other situations, a user may wish to initiate a new call or otherwise transfer an existing call between user devices that include more than just the smart phone itself. Nonetheless, if even possible, this can be an inconvenient process using existing communication systems and methods, and can often result in delays or dropped calls.

SUMMARY

Representative embodiments set forth herein disclose various systems and techniques for intelligently and efficiently managing calls and other communications between multiple associated user devices. In particular, the embodiments set forth various systems and techniques for allowing a connection manager executing on a user device to manage outside connections in various ways. This connection manager can be triggered to carry out its connection management operations in an automated manner (e.g., according to user settings) or in a reactive manner (e.g., in response to receiving a user input or command). According to some embodiments, a connection manager can operate by (1) routing an outside connection from a user device to a first associated user device when the first device is active or to a second associated user device when the first device is not active, (2) detecting a change in the status of the first device, and/or, in response, (3) rerouting the outside connection from one of the first or second devices to the other.

Under various embodiments, a connection manager can also, or alternatively, operate by (1) determining when an incoming connection is answered at a user device or an associated user device, (2) sending a silencing command to associated user devices using multiple different communication modes when the incoming connection is answered at the user device, and (3) instructing the user device to stop providing an incoming call alert when the incoming connection is instead answered at an associated user device. A different connection manager can be located on each of a plurality of user devices, such that each separate user device can be managed by a separate connection manager.

This Summary is provided only for purposes of summarizing some example embodiments so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described will become apparent from the following Detailed Description, Figures, and Claims.

Other aspects and advantages of the embodiments described herein will become apparent from the following detailed description taken in conjunction with the accompanying drawings, which illustrate, by way of example, the principles of the described embodiments.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and/or detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
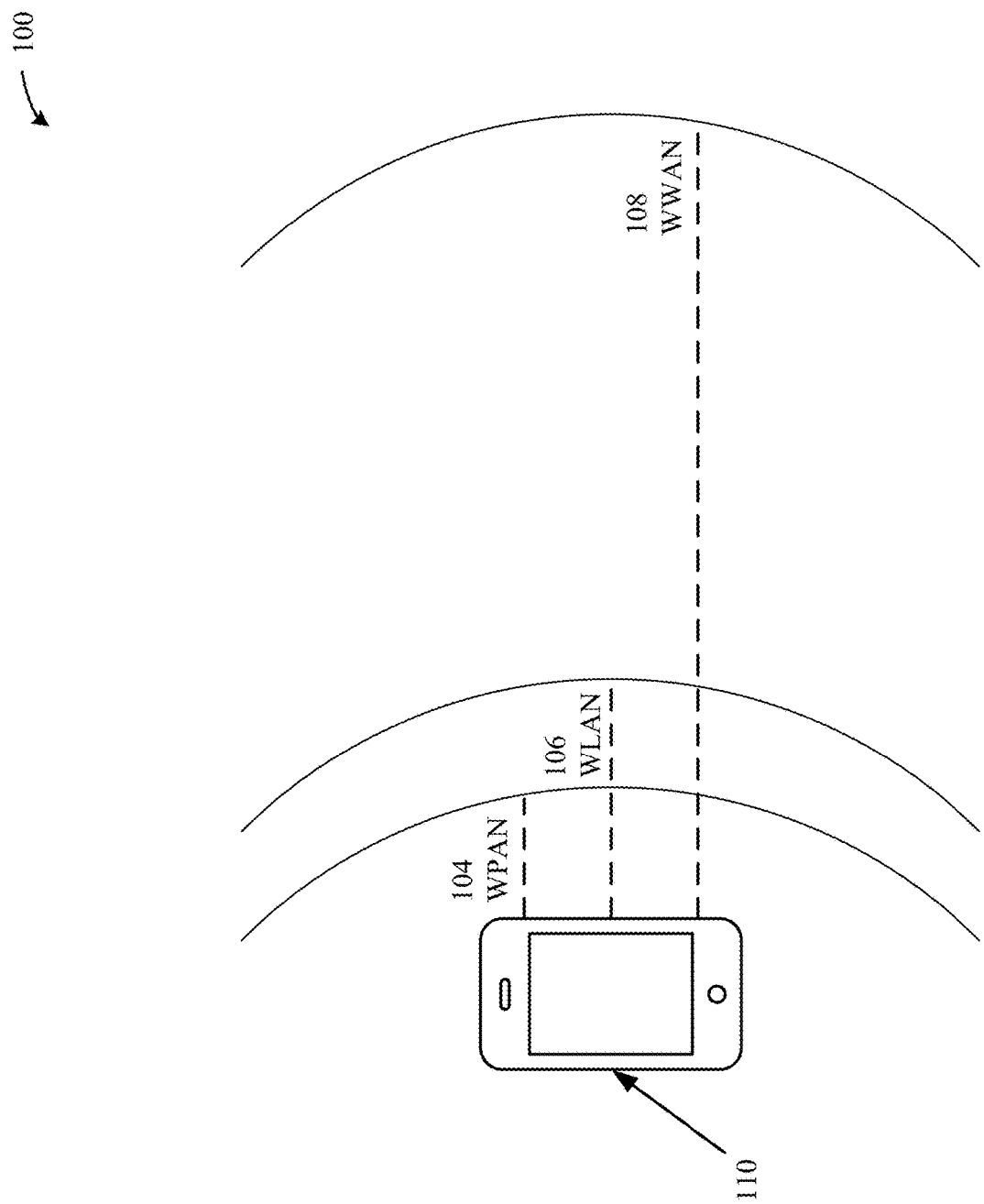
FIG. 1 illustrates in block diagram format a set of overlapping networks for an exemplary wireless communication user device, according to various embodiments of the present disclosure.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Oftentimes, a telephone call or other communication may come in to a device, e.g., a smart phone or other user device, while the device is nearby but not with the user, or when it may be otherwise inconvenient to answer the call or communication on the receiving device. In such situations, another associated device (e.g., registered with the same account) may be a more convenient or preferable device for responding to or otherwise acting on the incoming call or communication. In other situations, a user may wish to initiate a new call from, or otherwise transfer an existing call between, one or more user devices that include more than just a smart phone or original receiving device.

Accordingly, the embodiments set forth herein provide various systems and techniques for allowing a connection manager executing on a user device to manage outside connections various ways. This connection manager can be triggered to carry out its connection management operations in an automated manner (e.g., according to configured settings) or in a reactive manner (e.g., in response to receiving a command, such as user input). According to some embodiments, a connection manager can operate by (1) routing an outside connection from a user device to a first associated user device when the first device is active or to a second associated user device when the first device is not active, (2) detecting a change in the status of the first device, and in response (3) rerouting the outside connection from one of the first or second devices to the other.

Under various embodiments, a connection manager can also, or alternatively, operate by (1) determining when an incoming connection is answered at a user device or an associated user device, (2) sending a silencing command to associated user devices using multiple different communication modes when the incoming connection is answered at the user device, and (3) instructing the user device to stop providing an incoming call alert when the incoming connection is instead answered at an associated user device. A different connection manager can be located on each of a plurality of user devices, such that each separate user device can be managed by a separate connection manager.

Accordingly, the foregoing approaches provide systems and techniques for intelligently and efficiently managing outside connections between multiple associated user devices. A more detailed discussion of these systems and techniques is set forth below and described in conjunction with FIGS. 1 through 12, which illustrate detailed diagrams of systems and methods that can be used to implement these systems and techniques.

Wireless communication devices, and mobile devices in particular, can incorporate multiple different radio access technologies to provide connections through different wireless networks that offer different services and/or capabilities. A central wireless communication device can include hardware and software to support a wireless personal area network ("WPAN") according to a WPAN communication protocol, such as that which has been standardized by the Bluetooth® special interest group ("SIG"). The central wireless communication device can discover compatible peripheral or associated wireless communication devices and can establish connections to these peripheral or associated wireless communication devices in order to provide specific communication services through a WPAN. In some situations, the central wireless communication device can act as a communications hub that provides access through a wireless local area network ("WLAN") and/or through a wireless wide area network ("WWAN") to a wide variety of services that can be supported by various applications executing on the central wireless communication device.

Many applications and services can provide for alert notifications to present supplemental information to a user of the central wireless communication device, such as to indicate initiation of a proposed service connection (voice, video, Internet messaging, teleconferencing, etc.), to catalog one or more events (email, voice mail, reminders, appointments, etc.), or to indicate near real-time information (stock, weather, sports, news, etc.). Alert notifications can be presented on the mobile wireless communication device in accordance with any number of priorities and/or preferences, such as on demand (e.g., in response to a user input), as an overlay (e.g., as an indicator associated with a graphical icon), or as an interrupt (e.g., as a pop-up message). An alert notification service operating on a central wireless communication device can interact with an alert notification client operating on a peripheral or associated wireless communication device to provide information about various alert notifications available on the central wireless communication device to a user through the peripheral or associated wireless communication device. The alert notification client on the peripheral or associated wireless communication device can be defined as a profile for a WPAN wireless communication protocol, which can be, for example, a Bluetooth Low Energy ("BTLE") wireless communication protocol. The alert notification BTLE profile can provide a wide array of information for the peripheral or associated wireless communication device to present, e.g., to a user, and also mechanisms for providing and/or receiving alert notifications. In addition, the alerts can be received independently by a number of associated wireless communication devices. For example, a text message can be received at each wireless communication device on which the account is active, and these wireless communication devices may separately receive the text from a server or the central wireless communication device.

The alert notification profile (and service) can provide for an efficient transfer of information using a WPAN wireless communication protocol, while adding a capability for a bi-directional exchange of messages between the peripheral or associated wireless communication device (acting as a client) and the central wireless communication device (acting as a server). An event associated with an application (e.g., a proposed connection, one or more new or existing messages, a set of locally or remotely generated information) can prompt an alert notification at the central wireless communication device. A user or operator can configure one or more applications and/or categories of applications to provide alert notifications that contain all or a subset of information available at the central wireless communication device to the peripheral or associated wireless communication device. In some situations, this can include notifications to multiple peripheral or associated wireless communication devices.

The various embodiments described herein can involve wireless communications using one or more wireless technologies or protocols, such as, for example, a Bluetooth® WPAN communication protocol, between a set of associated wireless communication devices, which can include one or more user devices. Communications using this WPAN and/ or other wireless communication protocols can be made between one or more central server wireless devices and the set of associated wireless communication devices. In various situations, one or more of the associated user devices can function as a central wireless communication device for WPAN purposes, and can then communicate with one or more of the other associates user devices accordingly. For example, various alerts and commands can be sent between associated user devices using a WPAN according to the embodiments disclosed herein. Further, it will be understood that all communications discussed herein can comprise wireless communications unless stated otherwise.

Turning first to FIG. 1, a set of overlapping networks for a wireless communication user device is illustrated in block diagram format. User device 110 can include a combination of hardware and software to provide wireless connections using one or more different wireless networks alone, separately, or in combination, such as set of overlapping networks 100. The user device 110 can represent a device having wireless communications capacity, such as a smart phone (e.g., an iPhone®), a tablet device (e.g., an iPad®), a wearable device (e.g., an Apple Watch®), a portable media player (e.g., an iPod®), a laptop computer (e.g., a MacBook®), or a desktop computer (e.g., an iMac®), among other possible devices. Additional user devices can include a wireless headset, a vehicle sound system, a digital television, a digital media recorder, or any other suitable device capable of wireless communications.

The user device 110 can include hardware and software to provide communication using a WPAN 104, which can provide power efficient connections while operating over a relatively shorter range. WPAN connections can typically provide for connecting the user device 110 to peripheral and associated wireless communication devices, such as headsets, earpieces, supplemental display devices, and supplemental input/output devices, for example. A representative WPAN 104 can operate in accordance with a communication protocol specified by the Bluetooth SIG, for example. The user device 110 can also include hardware and software to provide communication using a WLAN 106 that can provide a higher data rate and a greater operating range than a WPAN 104. The user device 110 can include separate and/or shared hardware and software elements for the WPAN 104 and the WLAN 106. Both the WPAN 104 and WLAN 106 can operate as "local" networks. The user device 110 can also include additional hardware and software to provide a WWAN 108 capability, such as to interconnect with one or more cellular networks. The user device 110 can provide a multitude of services using one or more connections through its wireless networking capabilities, and an alert notification center on the user device 110 can provide alert notifications to a user for one or more services. In addition, local applications on the user device 110 can generate alert notifications to provide additional information and alerts to the user and/or other user devices. Alert notifications and related communications can be received from and/or transmitted to associated devices over any or all of WPAN 104, WLAN 106, and WWAN 108.

Figure 2:
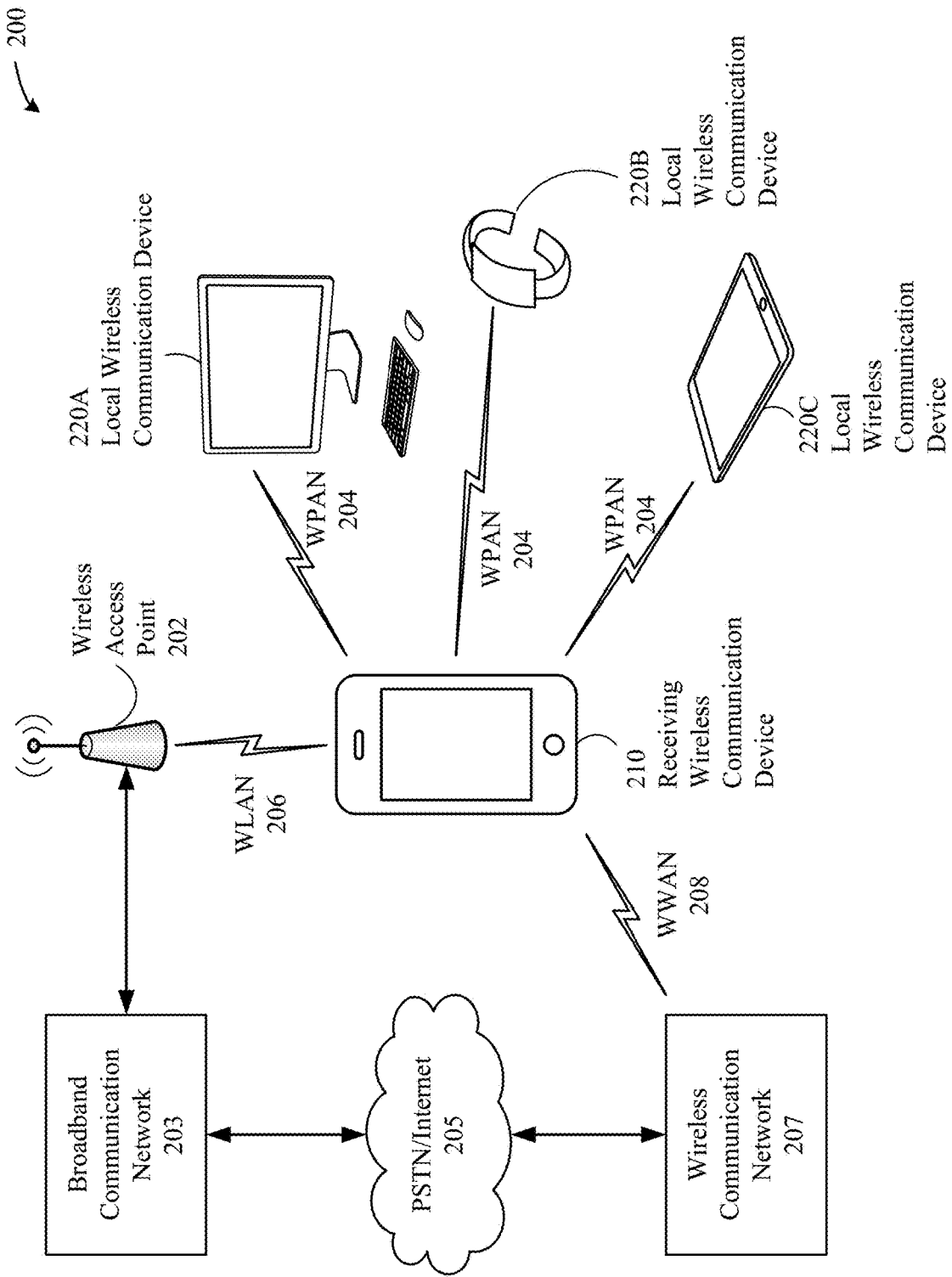
FIG. 2 illustrates in block diagram format an exemplary system of different wireless networks and devices, according to various embodiments of the present disclosure.

FIG. 2 illustrates in block diagram format an exemplary system of different wireless networks and devices according to various embodiments of the present disclosure. System 200 can include a receiving wireless communication user device 210 that can be interconnected through several different wireless communication technologies to an external set of networks and to a set of peripheral or associated local wireless communication user devices 220A, 220B, and 220C. The user device 210 can be a "central" device for WPAN purposes, and can receive information from one or more packet switched networks and/or from one or more circuit switched networks, the combination of which is represented in FIG. 2 as a combination of a public switched telephone network ("PSTN") and the "Internet" 205. The user device 210 can use a WWAN connection 208 provided through a wireless communication network 207 to access a broad variety of services (e.g., voice calls, text messages, data access, video calls, multimedia messaging, and media streaming). Similarly, the user device 210 can use a WLAN connection 206 provided through a wireless access point 202 interconnected to a broadband communication network 203 to access a similar wide range of services. The broad set of services provided through the WWAN connection 208 and/ or through the WLAN connection 206 can generate one or more alert notifications associated with the services or with applications executed by user device 210 that access and/or use the services. In addition, the user device 210 can use one or more WPAN connections 204 to one or more nearby peripheral or associated user devices 220A, 220B, 220C, as illustrated in FIG. 2.

Each of the associated user devices 220A, 220B, 220C illustrated in FIG. 2 can provide output display capabilities as well as input response capabilities to allow a user of the user device 210 to interact with various services or otherwise relay connections or communications there through, such as through one or both of a WLAN connection 206 or WPAN connection 204. For example, any of associated user devices 220A, 220B, 220C can provide call relay functionality for an incoming phone call or other connection to user device 210, such that the user can accept the incoming call or other connection at any of associated user devices 210, 220A, 220B, or 220C. Such call relay functionality can be provided by way of various WLAN connections to a host server (e.g., iCloud) via a common wireless access point 202, or by the various WPAN connections 204, for example. In addition, one, some or all of associated user devices 220A, 220B, and/or 220C can be standalone independent user devices that are able to operate independently of user device 210. In one specific non-limiting embodiment, associated user device 220A can be a desktop computing device, associated user device 220B can be an electronic watch device (or other "wearable"), and associated user device 220C can be a tablet device. It will be readily appreciated that other types and arrangements of wireless communication devices can be used, and that fewer or more than three such devices can be local wireless communication user devices associated with user device 210. As described further below, alert notifications may be collectively processed by wireless communication user devices 210 and 220 in the system in FIG. 2.

Figure 3:
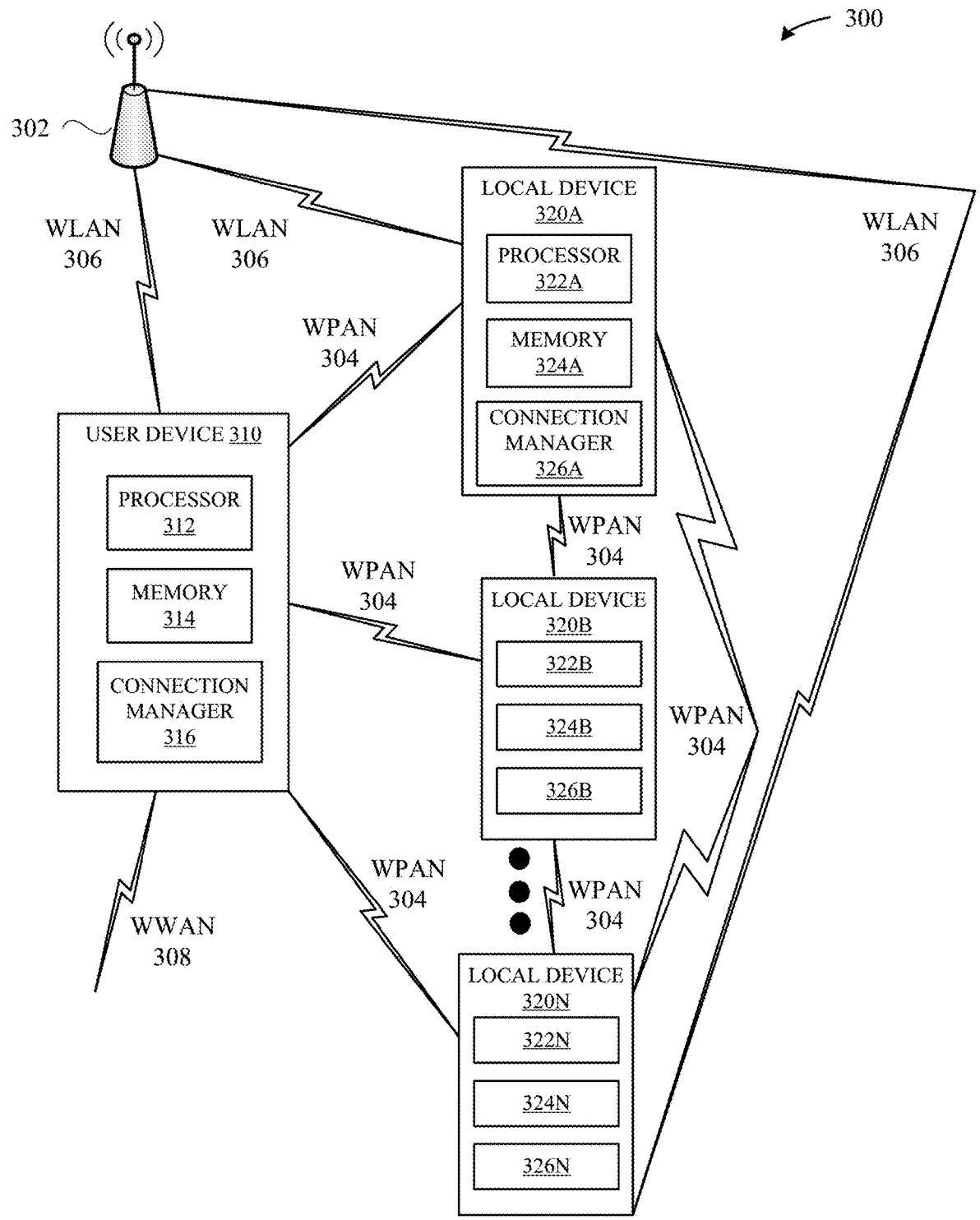
FIG. 3 illustrates in block diagram format a detailed view of particular exemplary components in a system of different wireless networks and devices, according to various embodiments of the present disclosure.

Continuing with FIG. 3, a detailed view of particular exemplary components in a system of different wireless networks and devices is shown in block diagram format. Similar to the foregoing example, system 300 can include a wireless user device 310 and a set of local wireless associated user devices 320. While three associated user devices 320A, 320B, 320N are shown in FIG. 3 for purposes of illustration, it will be appreciated that there can alternatively be one, two, four, or more user devices that can be in the set of associated user devices 320. In some arrangements, the set of associated user devices can include the user device 310 too. User device 310 can again be a smart phone, a tablet device, a wearable device, a portable media player, a laptop computer, a desktop computer, or other computing device capable of wireless communication. Each of associated user devices 320 might also be a smart phone, a tablet device, a wearable device, a portable media player, a laptop computer, a desktop computer, a wireless peripheral that serves user device 310, or other computing device capable of wireless communication. User device 310 can be adapted for wireless communications using one or more: WWAN connections 308, WLAN connections 306, and/or WPAN connections 304. Communications between user device 310 and any or all of associated user devices 320 can be by way of WPAN connections 304. One, some, or all of the associated user devices 320 are also able to communicate with each other, such as by way of WPAN connections 304. In addition, user device 310 and one or more of the associated user devices 320 can communicate using WLAN connections 306 with each other, a server, and/or a wireless access point 302.

In various embodiments, user device 310 can be a central wireless communications device with respect to the remainder of the set of associated user devices 320, such as for a call relay arrangement, a WPAN connection 304 arrangement, or both. In addition, or alternatively, each of user devices 310 and 320 can simply be a peer device with respect to the other user devices. In some arrangements, one or more of the other associated user devices 320 can be a central wireless communications device with respect to the other associated user devices, which may or may not include user device 310, such as for a call relay arrangement, a WPAN connection 304 arrangement, or both.

As shown in FIG. 3, the user device 310 can have a processor 312, an associated memory 314 communicatively coupled to the processor 312, and a connection manager 316 communicatively coupled to the processor 312 (and thereby to the memory 314). The processor 312 can be configured to implement the connection manager 316, and the connection manager 316 can be adapted to manage connections for the user device 310 and the set of associated user devices 320. Each of the associated user devices 320 can also similarly have its own separate processor 322A through 322N, associated memory 324A through 324N, and connection manager 326A through 326N. Each separate processor 322 can similarly be configured to implement its respective connection manager 326, which similarly can be adapted to manage connections for its respective user device 320 with any/all of the rest of the user device 310 and remaining set of associated user devices 320. Each connection manager 316 and 326 can be implemented as a software program, a module, or a component that resides on and/or remotely from its respective user device. Each connection manager 316 and 326 can similarly be adapted to manage connections in a variety of ways, such that it will be understood that functionality discussions and references to connection manager 316 specifically can also extend equally to every other connection manager 326. Further, it will be understood that references to connection management functionality, features, statuses, and the like that are made with respect to a specific user device may specifically apply to the connection manager for that user device.

In some arrangements, any of the user device 310 and the various associated user devices 320 can be able to answer a call or other connection that is incoming to or arriving specifically at user device 310, such as through a call relay or known user device grouping arrangement. Similarly, any of the user device 310 and the various associated user devices 320 can be able to respond to any other such alert or notification received at or directed to any of the other associated devices. Under such an arrangement, a call or other connection or alert/notification coming in to user device 310, such as using WWAN connection 308, can be relayed to a local server or other grouped device managing entity, such as using a WLAN connection 306 to a local access point 302. The incoming call or connection/alert/notification can then be broadcast from the local server or other grouped device managing entity to all of the user devices 310 and 320, such as using various WLAN connections 306, upon which all of the user devices may then ring, flash lights, and/or provide other alerts (visual, audible, and/or haptic) that the call or connection/alert/notification is incoming and can be answered at or responded to at any alert providing user device.

In the event that the incoming connection is answered (or responded to) at the user device 310 or any of the associated user devices 320, then the actual answering device can typically send a "connection answered" notification or status update so that all of the other user devices can stop ringing and/or providing other incoming connection alerts. Such a "call or connection answered" alert or status update can be sent using a first mode of communication to the other user devices. This first mode of communication can be, for example, in the form of a push message to the local server or other grouped device managing entity, such as by using a WLAN connection 306 via local access point 302. The local server or other group managing entity can then push the "call or connection answered" notification or status from local access point 302 using a WLAN connection 306 to each of the other individual non-answering user devices 310 and 320 so that those other non-answering user devices can stop providing alerts. These WLAN connections 306 can be in the form of localized Wi-Fi connections, for example. As will be readily appreciated, this push messaging relay via another server, device, or entity can take an elapsed time of 1-2 seconds or more on average, such that many of the user devices 310 and 320 continue to ring or provide alerts for a 1-2 seconds or more after the connection has been answered at one of the user devices. This delay or latency can be annoying or cumbersome in some instances, such that a faster alert silencing approach for the remaining user devices may be desirable.

Accordingly, a second faster mode of communication can be used to provide a "call or connection answered" notification, alert, or status update to the remaining user devices in a set of associated user devices. Alternatively, or in addition, a "silencing command" can be provided to the remaining user devices using this second mode of communication, which can be using one or more suitable WPAN connections 304. Such WPAN connections 304 can be, for example, BTLE, other Bluetooth®, or other short range wireless connections that travel directly from user device to user device ("peer-to-peer"), for example. These "connection answered" alerts and/or "silencing commands" or alerts can generally be broadcast by the answering user device using BTLE or another short range wireless protocol for a short period of time, such that all nearby user devices equipped to receive that form of communication (e.g., BTLE alerts or communications) can receive the connection answered alerts and/or silencing commands in that manner. The short period of time for this broadcast of a silencing command using BTLE (or other form of short range wireless communication) can be, e.g., on the order of about one to ten seconds. For example, in some implementations, the command notifying other (neighboring) devices to cease outputting an alert associated with a given event can be transmitted for approximately two seconds. Because the transmission of a BTLE or similar alert or command can be direct from user device to user device, the overall transmittal time can be much faster than a push message that travels indirectly, e.g., through the cloud or other central entity. In various embodiments, the total transmittal time using this second mode of communication can be on the order of about 200 milliseconds. Under this arrangement, the non-responding (e.g., non-answering) user devices can be silenced much more quickly.

Although a "connection answered" and/or "silencing command" can be sent using BTLE, such that other user devices can be silenced faster, it may be preferable in many embodiments to continue to send push messages that the connection has been answered. For example, there can be situations where a nearby user device is able to receive the push messages, such as using Wi-Fi or another suitable WLAN connection 306, but for some reason does not also get the BTLE alert or silencing command, such as using a WPAN connection 304. Accordingly, such a nearby user device would then still be silenced, albeit over the delay or longer period of time that it takes for the push message to arrive. Also, associated devices outside of the short range WPAN connection 304 can be silenced by the communication over the WLAN connection 306. In addition, other information or commands can also be sent as push messages from the centralized server or other device via the WLAN connection 306. Further, communications using the WLAN connections 306 can be bidirectional in nature, while the BTLE alerts or commands using the WPAN connections 304 do not need to be answered or even acknowledged. No handshake or bidirectional communication between user devices is necessary for such BTLE alerts or communications. Accordingly, in many embodiments the direct device to device communications using WPAN connections 304 can simply be "silencing commands" or alerts from the answering device, which can be in the form of BTLE broadcasting advertisements, for example.

Figure 4:
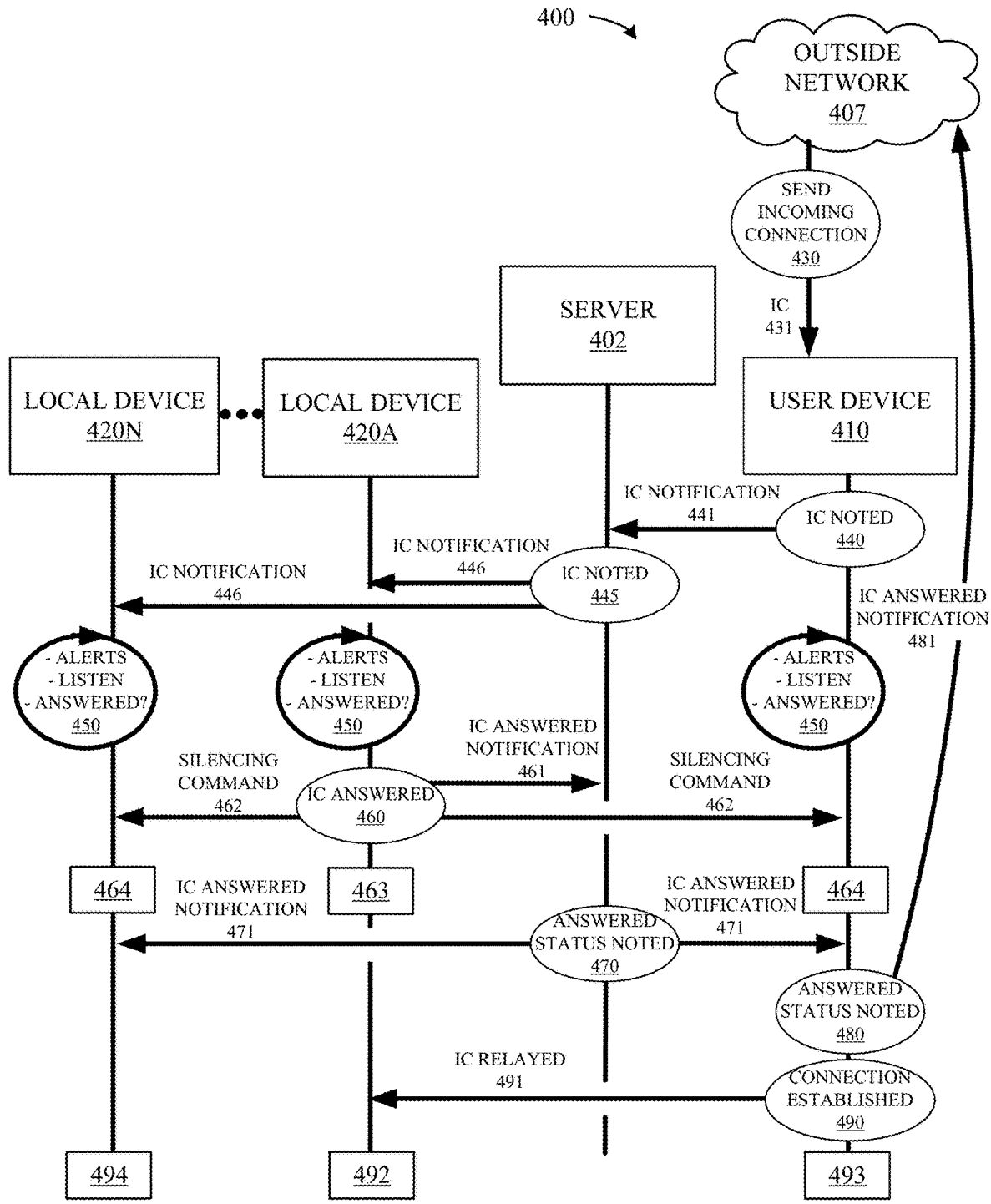
FIG. 4 illustrates a sequence diagram for an exemplary management of an incoming connection at a set of associated user devices having a relayed arrangement, according to various embodiments of the present disclosure.

Turning next to FIG. 4, a sequence diagram for an exemplary management of an incoming connection at a set of associated user devices having a relayed arrangement is illustrated according to various embodiments of the present disclosure. In arrangement 400, a user device 410 can be a central communication device for incoming connections 431 at user device 410 for itself and a set of local associated user devices 420. Incoming connections 431 can originate from an outside network 407, such as using a WWAN and/or another suitable connection, and a local server 402 can manage communications locally for all of the user devices 410 and 420. Server 402 can be adapted to communicate with user devices 410 and 420 in a variety of ways, such as by push messaging, for example. Each of user devices 410 and 420 can be any wireless capable communication device, such as, for example, a smart phone, a tablet device, a wearable device, a portable media player, a laptop computer, a desktop computer, or a wireless peripheral device that serves one of the other user devices, among other possible wireless communication devices. Incoming connection 431 can be any suitable connection, such as, for example, a voice call, a video call, an Internet message, a teleconference, a push message, a text message, a data transfer, an e-mail, a voice mail, a calendar reminder, an invite request, an appointment notification, or any other suitable form of wireless communication.

As one non-limiting example and for purposes of illustration, user device 410 can be a smart phone, outside network 407 can be a cellular services provider, incoming connection 431 can be a phone call, server 402 can be a local grouped devices management server (e.g., iCloud), and exactly two associated user devices 420A and 420N can be a desktop computing device and a tablet device, respectively, adapted as relay devices capable of answering calls directed to user device 410. The incoming connection 431 can thus be answered at any of user devices 410, 420A, or 420N, such as by way of a registered and grouped device arrangement. It will be understood that many other types, forms, and/or arrangements of devices, networks, and/or connections may also apply for this non-limiting example that is provided for purposes of illustration. Further, only one associated user device 420A or many more associated user devices 420 may be present in a particular arrangement, such as arrangement 400.

In various situations, such as for the present example being discussed, incoming connection 431 can be a connection that can be answered by a user. In addition, it will again be understood that any actions taken by any of the user devices 410, 420A, or 420N can be performed or directed by the respective connection manager for that user device.

At a first sequence event 430, an incoming connection 431 can be sent to user device 410 from an outside network 407. Again for purposes of discussion, incoming connection 431 will be referred to as a phone call or call, although any of the other types or forms of connections (e.g., messaging, conferencing, streaming, etc.) may similarly apply. Accordingly, a connection manager for user device 410 can receive a notification that the incoming connection 431 is arriving at the user device 410. At a following sequence event 440, the user device 410 can note that the incoming connection 431 is arriving and send a notification 441 that the incoming connection 431 is arriving to the server 402. This can be done by way of a push message sent using a WLAN communication, such as Wi-Fi, for example.

At a subsequent sequence event 445, the server 402 can note that the incoming connection 431 is arriving and send notifications 446 that the incoming connection 431 is arriving to the associated user devices 420A, 420N. This can also be done by way of push messages sent using WLAN communications, such as Wi-Fi, for example. Accordingly, respective connection managers for each of associated user devices 420A and 420N can receive a notification that the incoming connection 431 is arriving. This can be with respect to arriving at the user device 410 and/or at the respective associated user device 420A or 420N. At this point, every user device 410, 420A, and 420N can be aware that there is an incoming connection 431 that can be answered at any of user devices 410, 420A, and 420N.

At sequence event 450, each of user devices 410, 420A, and 420N can note that the incoming connection 431 is arriving and in response can provide one or more physical alerts or notifications that there is an incoming connection 431, can determine whether the incoming connection 431 has been answered at itself, and can listen for communications from any of the other user devices 410, 420A, and 420N. Each of these processes can occur in parallel at a given user device 410, 420A, 420N, and/or each of these processes can continue until the incoming connection 431 is gone, until the incoming connection 431 is answered at one of the user devices 410, 420A, or 420N, or until another end condition occurs. These different processes can end differently and/or at different times from each other and across different user devices depending upon specific circumstances. Also, sequence event 450 may start earlier for user device 410, e.g., immediately upon user device 410 learning that incoming connection 431 is arriving. Similarly, sequence event 450 for each of associated user devices 420A and 420N may start upon that respective user device learning about incoming connection 431. Accordingly, a slightly time staggered implementation may take place at each user device for the parallel processes of providing physical alerts, determining whether the connection has been answered at itself, and listening for communications from other devices.

Physical alerts can be provided at each respective user device 410, 420A, and 420N. This can happen, for example, by way of each respective connection manager instructing one or more output components on its respective user device to provide an alert that the incoming connection 431 is arriving and has not been answered. Physical alerts can comprise audible alerts (e.g., ringing), haptic alerts (e.g., vibration), and/or visual alerts (e.g., blinking lights or screen indicators). Each user device 410, 420A, 420N can listen for communications using multiple communication modes, such as first and second communication modes. A first communication mode can be, for example, Wi-Fi or other WLAN communications, which may take the form of push messages that come indirectly from another user device 410, 420A, 420N, such as by way of server 402. A second different communication mode can be, for example, Bluetooth® or other WPAN communications, which may take the form of BTLE alerts, advertisements, and/or commands that come directly from another user device 410, 420A, 420N.

At sequence event 460, incoming connection 431 can be answered at associated user device 420A. This can represent, for example, a relayed phone call being answered at a desktop computer associated with a smart phone in one specific arrangement. Other arrangements might alternatively apply, and it will be readily appreciated that incoming connection 431 could instead have been answered at any of the other user devices 410, 420N, with the following messages, events, and outcomes then changing correspondingly. When the incoming connection 431 is answered at user device 420A, a connection manager for that user device 420A can determine that the incoming connection 431 has indeed been answered there, can generate a silencing command, and can transmit the silencing command using first and second wireless modes of communication. The silencing command can take a variety of forms, such as embedded in a "call answered" push message and/or embedded in a BTLE alert or advertisement, for example.

Thus, sequence event 460 can also include a "call answered" notification 461 that is sent from the user device 420A (e.g., answering device) directly to the server 402. This can again be done by way of a push message sent using a WLAN communication, such as Wi-Fi, for example. Notification 461 can include the silencing command therein, or it may be inherent to a "call answered" notification that other user devices are commanded to be silenced. Sequence event 460 can thus also include a "silencing command" notification 462 that is sent from the user device 420A (e.g., answering device) directly to the other user devices 410, 420N (e.g., non-answering devices). This can be done by way of a BTLE alert or advertisement sent using a WPAN communication, for example. Notification 462 can include the silencing command therein, and can take the form of a WPAN broadcast, e.g., transmitted periodically, occasionally, or continuously for a range of durations from less than one second to up to ten seconds, such as for about two seconds in some implementations. Again, this form of direct device to device communication can be relatively fast, such that the transmittal time is on the order of about 200 milliseconds.

Notification 462 containing a silencing command can be received as an incoming silencing command at each of non-answering user devices 410 and 420N, whereupon those devices can then stop providing physical alerts that the incoming connection 431 is arriving and has not yet been answered. In particular, the connection manager for each of these respective devices 410, 420N can receive the incoming silencing command and instruct its respective output component(s) to stop providing alert(s). The connection manager for the answering user device 420A can also similarly instruct its respective output component(s) to stop providing alert(s) when the incoming connection 431 is answered at user device 420A. Accordingly, user device 420A can then be at a state 463 where the incoming connection 431 has been answered there and physical alerts regarding the incoming connection 431 have been stopped, while user devices 410 and 420N can then be at a state 464 where physical alerts regarding the incoming connection 431 have been stopped.

At sequence event 470, the server 402 can note that the incoming connection 431 has been answered and can send or forward "call answered" notifications 471 to each of the non-answering user devices 410 and 420N. This can again be done by way of a push message sent using a WLAN communication, such as Wi-Fi, for example. These "call answered" notifications 471 can include an actual or inherent "silencing command," in addition to other call answered information. Additional information can include a confirmation that the call or incoming communication was actually answered at another user device, as well as which other user device answered. While the silencing command notifications 462 above can typically arrive at each non-answering user device 410, 420N faster than the call answered notifications 471 do, these call answered notifications can provide additional information as well as a backup silencing command in the event that a given user device does not receive a separate silencing command notification 462 for any reason. In other words, silencing command notifications 462 can be used solely as a faster way to tell other user devices to "silence" or otherwise stop providing physical alerts, while call answered notifications 471 can provide additional information and functionality. Accordingly, user device 410 may stop providing alerts upon receiving a silencing command notification 462, but may wait until receiving a call answered notification 471 to confirm and actually process which other user device has answered the incoming connection 431 to act accordingly.

It will be appreciated then that silencing commands can be a relatively faster and lower-level way to have various user devices stop providing physical alerts. Such silencing commands can be sent in response to an incoming connection being answered at another user device, and can also be sent in response to various other events. For example, a user can send such a faster and lower-level silencing command via a user input remotely from another device, rather than waiting for a push message to send a silencing command, or even for the incoming connection to be answered at any user device. Other inputs and settings can also be used to control the sending of these relatively faster and lower-level silencing commands between user devices according to other preferences, events, and occurrences as well.

At sequence event 480, the user device 410 can note that the incoming connection 431 has been answered can send a notification 481 to the outside network 407 that the incoming connection 431 has been answered or accepted, upon which a connection can then be established between the outside network 407 and the user device 410 at sequence event 490. This established connection can be made from the outside network 407 to the user device 410, where the connection is then relayed to the associated user device 420A where the incoming connection 431 was actually answered, since the outside network 407 only sees and interacts with user device 410. The user device 410 preferably then does not send such a notification 481 to the outside network 407 upon receiving a silencing command notification 462 (which can mean a number of things other than incoming connection 431 being answered or accepted), but rather upon receiving a call accepted or call answered notification 471.

At sequence event 490, the user device 410 can also provide a relay 491 of the established connection from itself to the associated user device 420A where the incoming connection 431 was answered, where the accepted and established connection can then be handled for the user. This can be done directly, or can be done by way of server 402 or another suitable grouped device managing entity. At this point, the answering user device 420A can be at a state 492 where it is handling the established connection and no longer providing alerts, the user device 410 can be at a state 493 where it is relaying the connection from outside network 407 to user device 420A and is no longer providing alerts, and all other user devices 420N can be at a state 494 where they are not acting on the incoming connection 431 at all, are aware that the incoming connection 431 was answered, are no longer providing alerts, and may be aware that the incoming connection 431 was answered at user device 420A.

Figure 5:
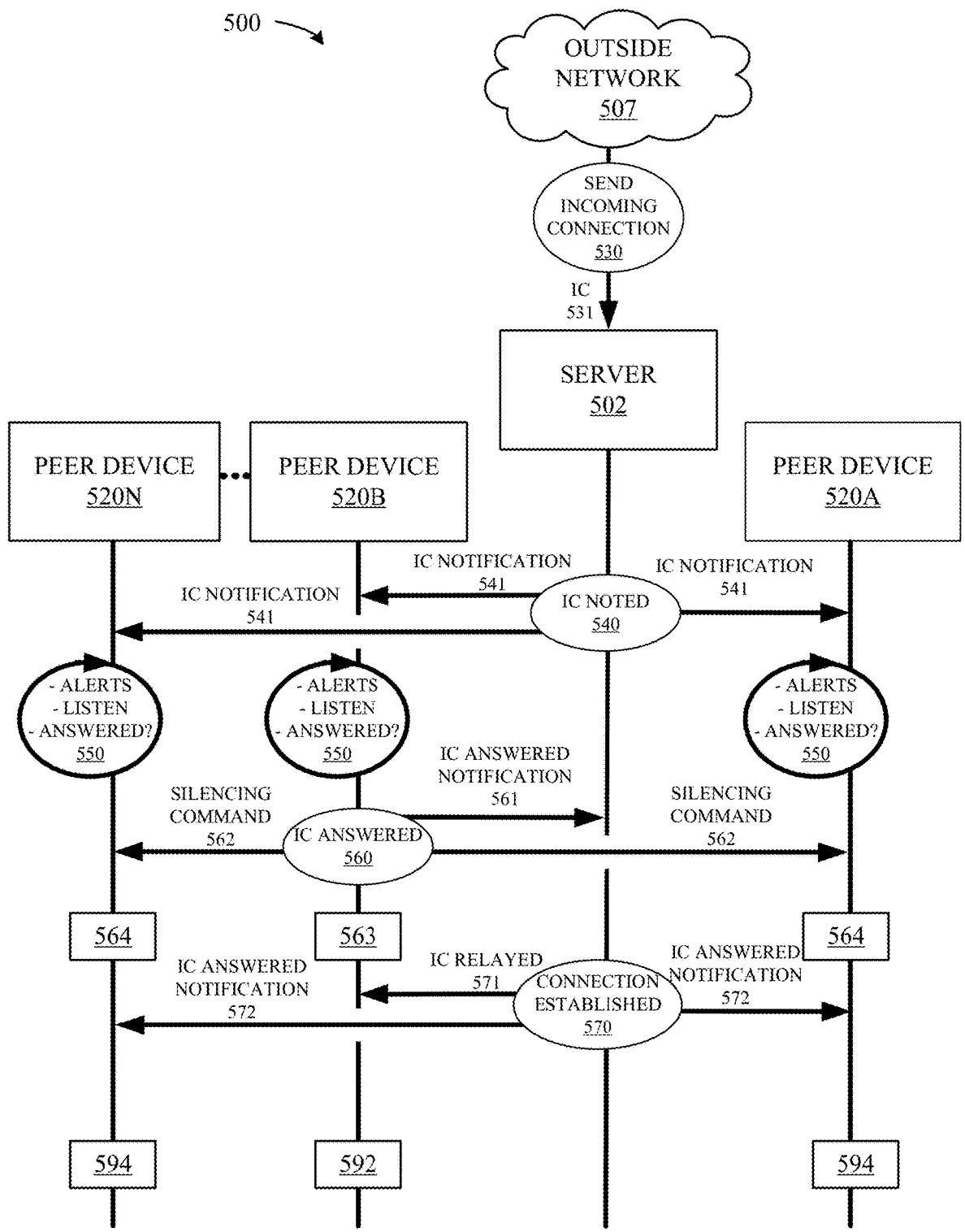
FIG. 5 illustrates a sequence diagram for an exemplary management of an incoming connection at a set of associated user devices having no relayed arrangement, according to various embodiments of the present disclosure.

FIG. 5 illustrates a sequence diagram for an exemplary management of an incoming connection at a set of associated user devices having no relayed arrangement according to various embodiments of the present disclosure. Arrangement 500 can be similar to arrangement 400 above, in that an outside network 507 can send incoming connections 531 to associated user devices 520. Unlike relayed arrangement 400 above where one of the user devices serves as a central device, however, non-relayed arrangement 500 can utilize a server 502 or another suitable grouped device communications managing entity that serves as the central device to receive the incoming connections 531. In still other embodiments, server 502 can represent a network that includes multiple servers, in which peer devices 520 each can register with an accessible server, such that some or all of the peer devices 520 may be registered with a different server. (Thus, there may be coordination between peer devices 520 and between network resources, such as servers.) Accordingly, each of the associated user devices 520 can be a peer device with respect to all of the other user devices, all of which collectively form a set of associated user devices.

In arrangement 500, each of user devices 520 can similarly be any wireless capable communication device, while incoming connection 531 can be any suitable connection, as set forth above. At a first sequence event 530, an incoming connection 531 can be sent to a server 502 or similar entity from an outside network 507. Again for purposes of discussion, incoming connection 531 can be referred to as a phone call or call, although any of the other types or forms of connections may similarly apply. At a following sequence event 540, the server 502 can note that the incoming connection 531 is arriving and send notifications 541 that the incoming connection 531 is arriving to each of the associated user devices 520. Similar to the foregoing example, this can be done by way of a push message sent using a WLAN communication, such as Wi-Fi, for example. Accordingly, respective connection managers for each of associated user devices 520 can receive a notification that the incoming connection 531 is arriving.

At sequence event 550, each of user devices 520 can note that the incoming connection 531 is arriving and, in response, can provide one or more physical alert(s) that there is an incoming connection 531, can determine whether the incoming connection 531 has been answered at itself, and can listen for communications from any of the other user devices 520. Again, each of these processes can occur in parallel at a given user device 520, and/or each of these processes can continue until the incoming connection 531 is gone, until the incoming connection 531 is answered at one of the user devices 520, or until another end condition occurs. Details regarding physical alerts, listening for communications, and multiple communication modes can all be the same as for the foregoing embodiments from arrangement 400.

At sequence event 560, incoming connection 531 can be answered at associated/peer user device 520B. This can represent, for example, a phone call being answered at a desktop computer associated with the server 502 in one specific arrangement. Other arrangements might alternatively apply, and it will be readily appreciated that incoming connection 531 could instead have been answered at any of the other user devices 520, with the following messages, events, and outcomes then changing correspondingly. When the incoming connection 531 is answered at user device 520B, a connection manager for that user device 520B can determine that the incoming connection 531 has indeed been answered there, can generate one or more silencing commands, and can transmit the silencing command(s) using first and second wireless modes of communication. The silencing command(s) can again take a variety of forms, such as embedded in a "call answered" push message and/or embedded in a BTLE alert or advertisement, for example.

Similar to the foregoing example, sequence event 560 can include a "call answered" notification 561 that is sent from the user device 520B (e.g., answering device) directly to the server 502, as well as a "silencing command" notification 562 that is sent from the user device 520B (e.g., answering device) directly to the other user devices 520 (e.g., non-answering devices). Again, notification 561 can be a push message sent using a Wi-Fi or other WLAN communication, while notification 562 can be a BTLE alert or advertisement sent using a WPAN communication, for example. Notification 562 containing a silencing command can be received as an incoming silencing command at each of non-answering user devices 520, whereupon those devices (and answering user device 520B) can then stop providing physical alerts that incoming connection 531 is arriving and has not yet been answered. Accordingly, user device 520B can then be at a state 563 where the incoming connection 531 has been answered there and physical alerts regarding the incoming connection 531 have been stopped, while each of non-answering user devices 520 can then be at a state 564 where physical alerts regarding the incoming connection 531 have been stopped but they may not yet be aware of whether or where the incoming connection 531 was answered. Because of differences in propagation and processing, silencing commands 562 may be received at and/or may cause the non-answering devices 520 to stop issuing physical alerts at different times.

At sequence event 570, the server 502 can note that the incoming connection 531 has been answered and establish an accepted connection with the outside network 507. Server 502 can then provide a relay or transfer 571 of the incoming connection 531 to user device 520B, where the incoming connection 531 can then be handled, e.g., by presenting audio/video signals to the user. Server 502 can also send or forward "call answered" notifications 572 to each of non-answering user devices 520. Again, these "call answered" notifications 572 can include an actual or inherent backup "silencing command," in addition to other call answered information, and can be send as push messages, such as using a Wi-Fi or other WLAN connection. Again, the silencing commands can typically be transmitted and received faster by way of second communication mode direct BTLE alert notifications 562 than by way of first communication mode push message combinations of notification 561 and notification 572. At this point, the answering user device 520B can be at a state 592 where it is handling the now established connection for incoming connection 531 and is no longer providing alerts, while all other non-answering user devices 520 can be at a state 594 where they are not acting on the incoming connection 531 at all, are aware that the incoming connection 531 was answered, are no longer providing alerts, and may be aware that the incoming connection 531 was answered at user device 520B.

Figure 6:
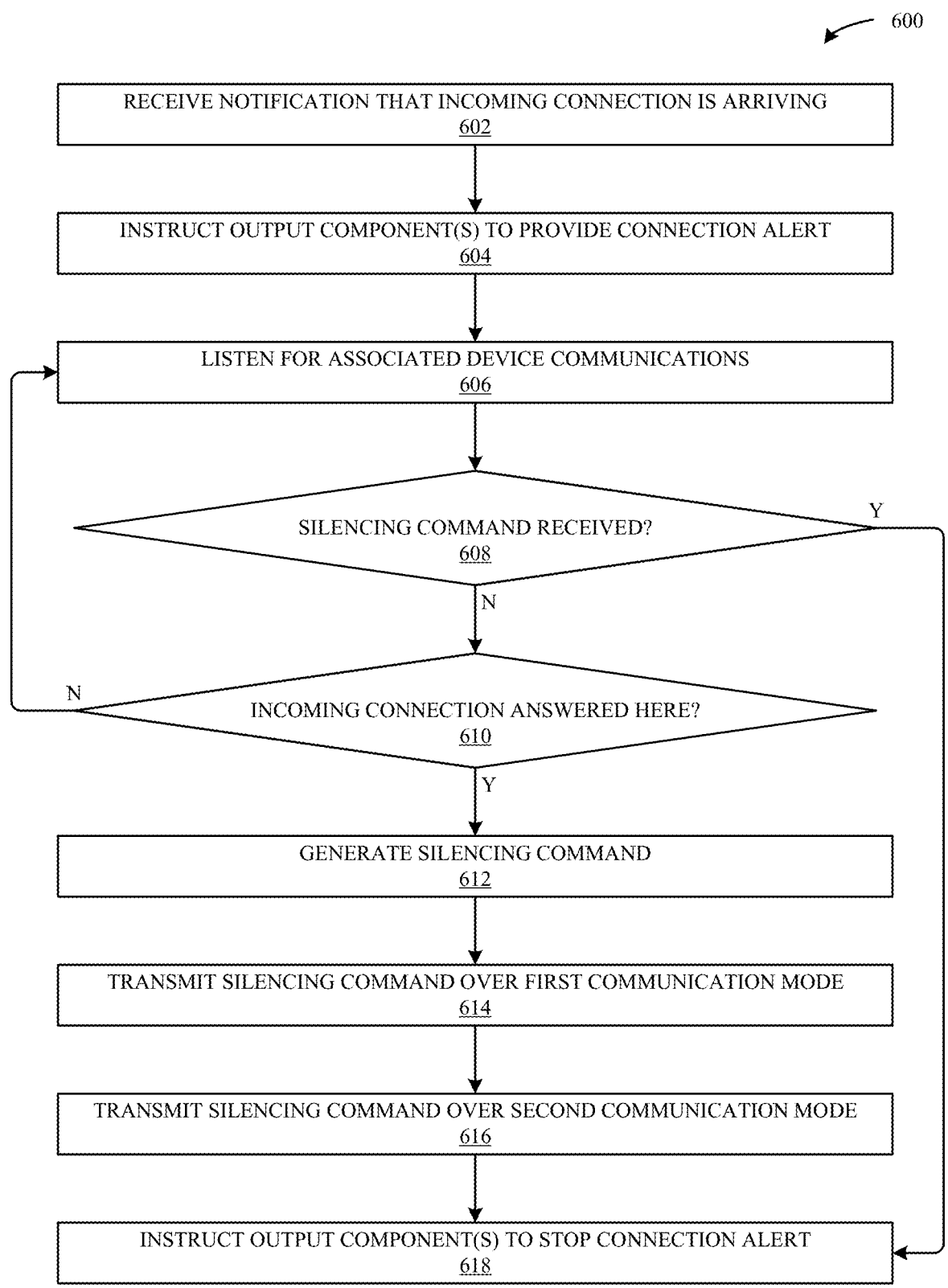
FIG. 6 illustrates a flowchart of an exemplary method performed by a connection manager for managing outside connections on a set of associate user devices, according to various embodiments of the present disclosure.

FIG. 6 illustrates a flowchart of an exemplary method performed by a connection manager for managing outside connections on a set of associate user devices according to various embodiments of the present disclosure. The connection manager can execute on its respective given user device and can manage outside connections for its given user device in particular amongst the set of associated user devices, which set can include the given user device. In various embodiments, each user device in a set of associated user devices can have its own connection manager. Method 600 can start at step 602, where the connection manager can receive a notification that an incoming connection is arriving at a user device. The incoming connection can be, for example, a voice call, a video call, an Internet message, a teleconference, a push message, a text message, a data transfer, another suitable form of wireless communication or any event for which there is a recurring alert or notification, while the user device can be, for example, a smart phone, a tablet device, a wearable device, a portable media player, a laptop computer, or a desktop computer, among other possible wireless communication devices.

At step 604, the connection manager can instruct one or more output components on the user device to provide connection alert(s), such as physical alert(s) that the incoming connection is arriving and has not been answered. Again, this can involve ringing, flashing lights, visual messages, haptic output, and the like. At step 606, the connection manager can listen for communications from any associated user device, which communications can be made using one or both of a first mode of communication and a second mode of communication. As detailed above, the first mode of communication can involve indirect push messages using Wi-Fi or another WLAN connection, while the second mode of communication can involve direct BTLE advertisements or alerts using a WPAN connection, for example.

At decision step 608, the connection manager can determine whether a silencing command has been received. This can be, for example, where the connection manager can receive an incoming silencing command from an associated user device using the first mode of communication, the second mode of communication, or both, and such a receipt can be a separate method step when it does take place. If such a silencing command has been received, then the method skips to step 618, where the connection manager can instruct the one or more output components on its user device to stop providing the connection alert(s). If no silencing command has been received, however, then the method can continue to decision step 610.

At decision step 610, the connection manager can determine whether the incoming connection has been answered at its own user device. If not, then the method reverts to step 606, where the connection manager can continue to listen for associated device communications. In various embodiments, decision steps 608 and 610 can be performed in parallel or in reverse order. In various embodiments, any or all of steps 604 through 610 can be performed in parallel, which can continue until a yes is returned at step 608 or 610. When it is determined that the incoming connection has been answered at its own user device at step 610, then the method can continue to step 612.

At step 612, the connection manager can generate a silencing command in response to the incoming connection being answered at its user device. At step 614, the connection manager can transmit the silencing command using the first wireless mode of communication (e.g., indirect push messaging) to be received at the associated user devices. This transmittal can be in the form of a "call answered" push message notification sent to a server, for example. At step 616, the connection manager can transmit the silencing command using the second wireless mode of communication (e.g., direct BTLE alerts) to be received at the associated user devices. This can be in the form of a "silencing command only" BTLE advertisement broadcast that goes directly to the other user devices, for example.

At step 618, the connection manager can instruct the one or more output components on its user device to stop providing the connection alert(s). In various embodiments, all of steps 614 through 618 can be performed simultaneously when the incoming connection is answered at the user device of the connection manager, and method 600 can end after any instance where step 618 is performed.

Figure 7:
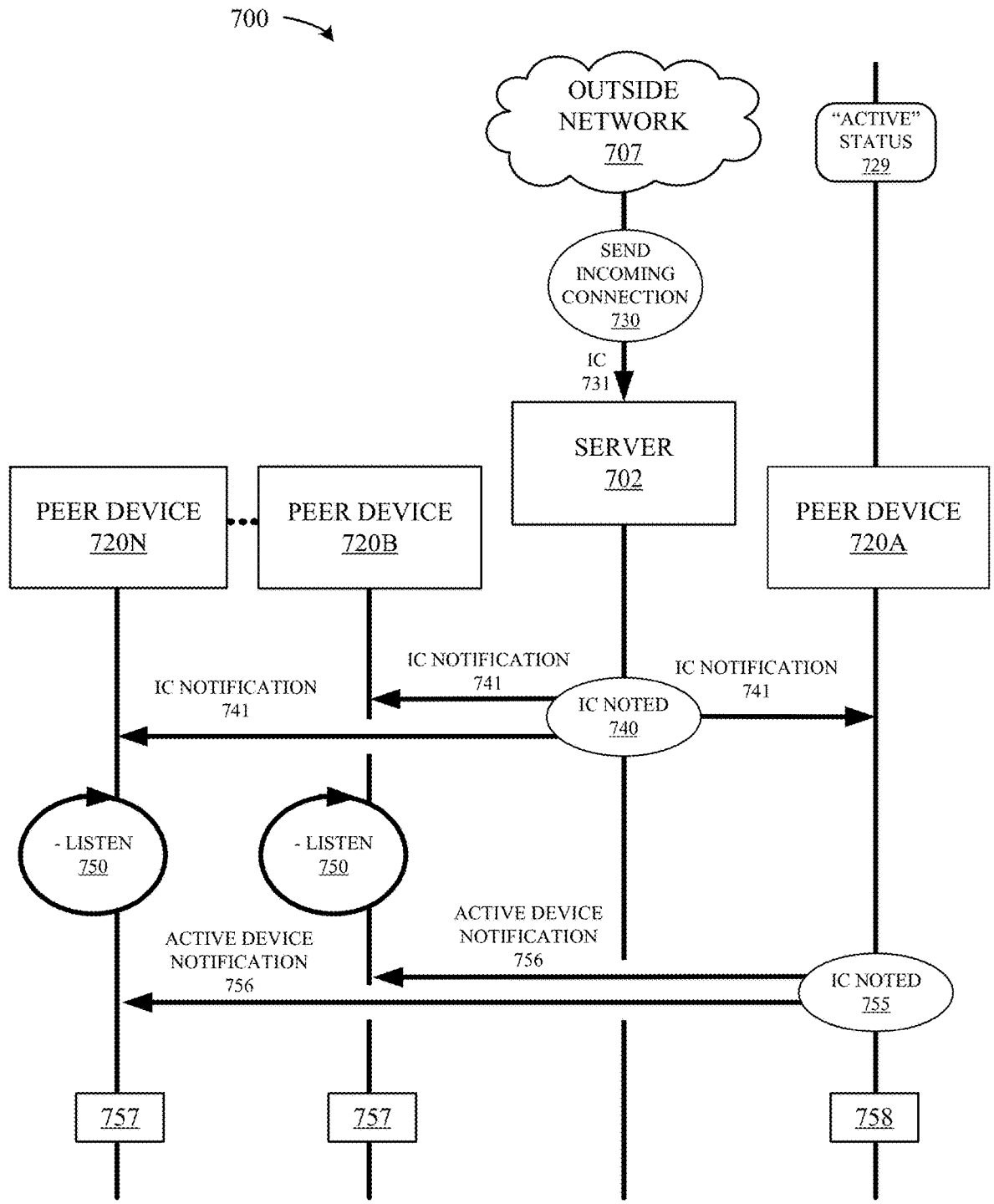
FIG. 7 illustrates a sequence diagram for an exemplary management of an incoming connection at a set of associated user devices having an active device, according to various embodiments of the present disclosure.

Moving next to FIG. 7, a sequence diagram is provided for an exemplary management of an incoming connection at a set of associated user devices having an active device according to various embodiments of the present disclosure. Arrangement 700 can be similar to arrangements 400 and 500 above, in that an outside network 707 can send incoming connections 731 to associated user devices 720. Unlike arrangements 400 and 500 above, however, arrangement 700 can include a situation where one of the user devices is or has been designated as an "active device." Such an "active device" designation can apply with similar effects to either of a relayed or non-relayed arrangement, as detailed above. Under any such arrangement, a central user device (not shown) or a server 702 or other suitable grouped device communications managing entity can serve as a central device to receive the incoming connections 731. In the latter arrangement 700 as shown, each of the associated user devices 720 can again be a peer device with respect to all of the other user devices, all of which collectively form a set of associated user devices.

An "active device" can be a designation that is given to whichever of user devices 720 is currently being used by a user, is currently processing, or is otherwise provided that status according to any of variety of settings or user preferences. This active device designation can vary according to the type of incoming connection 730 in various embodiments. In the event that two or more of user devices 720 are currently being used by a user, then a hierarchy chart or set of priority rules can be applied to determine which user device, if any, should be designated as the active device. For example, where a user is determined to be currently using his or her desktop computer only (e.g., user device 720B), then that user device can be designated as the active device for all incoming connections 731. Where multiple user devices are simultaneously in use, then a smart phone (e.g., user device 720A) currently in use might be designated as the active device for phone calls, a desktop computer (e.g., user device 720B) currently in use might be designated as the active device for e-mails, and so forth. In some situations, none of user devices 720 might be designated as an active device.

At an initial sequence event or other point in time prior to an incoming connection 731 being made, one of the peer or associated user devices 720 can be designated as an active device. This can be, for example, where user device 720A is designated with active device status at state 729. Alternatively, or in addition, one or more active device designations or determinations can be made by one or more system components, such as server 702, at the time that an incoming connection 731 is made. As one example, user device 720A can be currently in use by the user, such that it knows that it is an active device.

At sequence event 730, an incoming connection 731 can be sent to a server 702 or similar entity from an outside network 707. Again for purposes of discussion, incoming connection 731 can be referred to as a phone call or call, although any of the other types or forms of connections may similarly apply. At a following sequence event 740, the server 702 can note that the incoming connection 731 is arriving and send notifications 741 that the incoming connection 731 is arriving to each of the associated user devices 720. Similar to the foregoing example, this can be done by way of a push message sent using a WLAN communication, such as Wi-Fi, for example. Accordingly, respective connection managers for each of associated user devices 720 can receive a notification 741 that the incoming connection 731 is arriving.

At sequence event 750, each of non-active user devices 720B through 720N can note that the incoming connection 731 is arriving and in response can listen for communications from any of the other user devices 720, where such communications can again be by way of multiple communication modes, such as those detailed above. At this point, the communications listened for can include alert communications as to whether another of the other user devices 720 is an active device. In various embodiments that include such active device designations and features, the non-active user devices 720B through 720N can delay providing physical alerts for a short amount of time until it can be determined that no other user device is an active user device. Such active device listening and alert delay embodiments can be combined with one or more of the foregoing embodiments in a manner that will be readily appreciated by one of skill in the art. If no active device alert communication is received for a short designated period of time, then any non-active user device can proceed as usual according to any of the foregoing embodiments. Such a short designated period of time can be, for example, slightly longer than the typical transmittal time for a direct BTLE advertisement or alert communication (e.g., about 200 milliseconds). The short designated period of time might then be about 300-400 milliseconds.

At sequence event 755, which can take place at the same time as sequence event 750, active user device 720A note that the incoming connection 731 is arriving and can respond to notification 741 by sending out its own notifications 756 that it is an (or the) active user device. These notifications 756 can be, for example, a BTLE advertisement or alert sent using a WPAN communication, for example. Notifications 756 can take the form of a WPAN broadcast emitted periodically, occasionally, or continuously for a range of durations from less than one second up to approximately ten seconds, e.g., for about two seconds in some implementations. Again, this form of direct device to device communication can be relatively fast, such that the transmittal time is on the order of about 200 milliseconds to every other non-active user device 720B through 720N. Notifications 756 can be received at non-active user devices 720B through 720N, whereupon these user devices can be put into a state 757. The active user device 720A can immediately enter a separate state 758 upon receiving notification 741 and knowing that it is the active user device for incoming connection 731.

State 757 can include each respective non-active user device 720B through 720N knowing that an incoming connection 731 is arriving, but that another associated user device is an active device for at least that incoming connection 731. In various embodiments, this state 757 can include providing no incoming connection alerts at the non-active device, or it can include providing alerts, but limiting them to visual alerts (e.g., blinking light, caller ID) and/or haptic alerts (e.g., vibrations) with no audible alerts (e.g., ringing). State 758 can include full alerts being provided at the active user device 720A. In various embodiments, each of the active and non-active user devices 720 can then enter sequences where they wait and listen to see if and where the incoming connection is answered, such as at sequence events 450 or 550 above.

Figure 8:
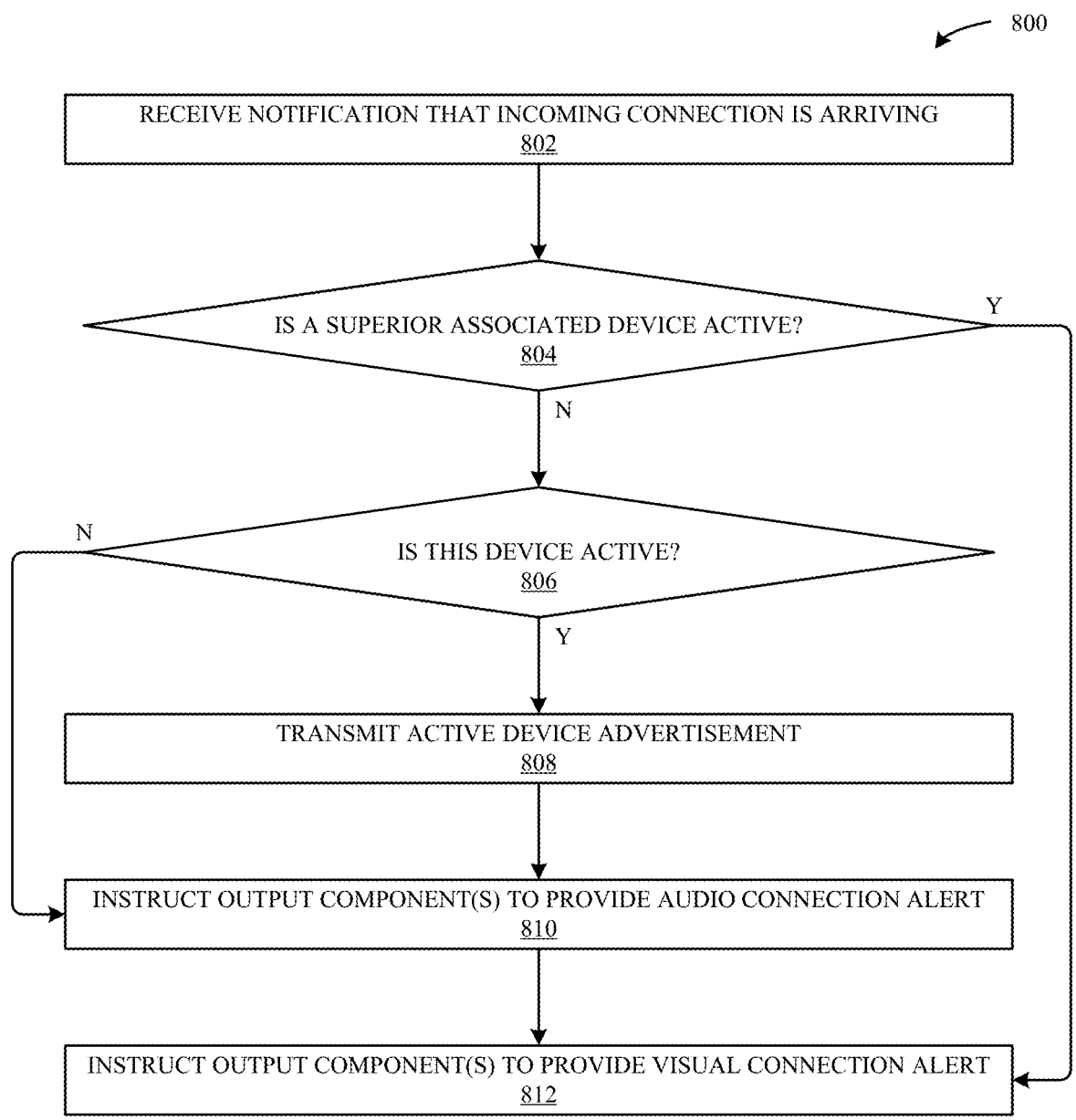
FIG. 8 illustrates a flowchart of an exemplary method performed by a connection manager for managing outside connections on a set of associated user devices having an active device, according to various embodiments of the present disclosure.

FIG. 8 illustrates a flowchart of an exemplary method performed by a connection manager for managing outside connections on a set of associated user devices having an active device according to various embodiments of the present disclosure. Again, the connection manager can execute on its respective given user device and can manage outside connections for its given user device in particular amongst the set of associated user devices, which set can include the given user device. In various embodiments, each user device in a set of associated user devices can have its own connection manager. Method 800 can start at step 802, where the connection manager can receive a notification that an incoming connection is arriving at a user device. Again, the incoming connection can be any such as those set forth above, and the user device can be any such as those set forth above.

At decision step 804, the connection manager can determine whether any associated user device is an active device. This can be done in the context of whether an active device assertion made by another associated user device is superior to an active device assertion that could be made for this user device. That is, where the connection manager might know or determine that its own user device is an active device, another assertion or alert of an active device by an associated user device might be superior. For example, where a desktop computer is currently in use and therefore active, an incoming active device alert or assertion from a smart phone can be considered a superior assertion when the incoming connection is a phone call. Of course, where the user device for the connection manager is not an active device, then any incoming notification or alert that another associated user device is an active device would apply. Upon determining that another associated user device is active or has a superior claim to be an active device, then the method can continue to step 812, where the connection manager can instruct one or more output components on its user device to provide visual alert(s) only. When it is determined that no other active device claim or superior active device claim applies, however, then the method continues to decision step 806.

At decision step 806, the connection manager can determine whether its own user device is an active device. If so, then the method continues to step 808, where an active device notification can be generated and transmitted. Again, this can be in the form of a BTLE alert or advertisement that can be broadcast using a WPAN connection to all of the other associated user devices. The method can then continue to step 810, where the connection manager can instruct one or more output components on its user device to provide audio alert(s), and step 812, where the connection manager can instruct its output component(s) to provide visual alert(s) and/or haptic alert(s) as well. When step 810 is performed, then step 812 can be performed in parallel in some embodiments.

Figure 9:
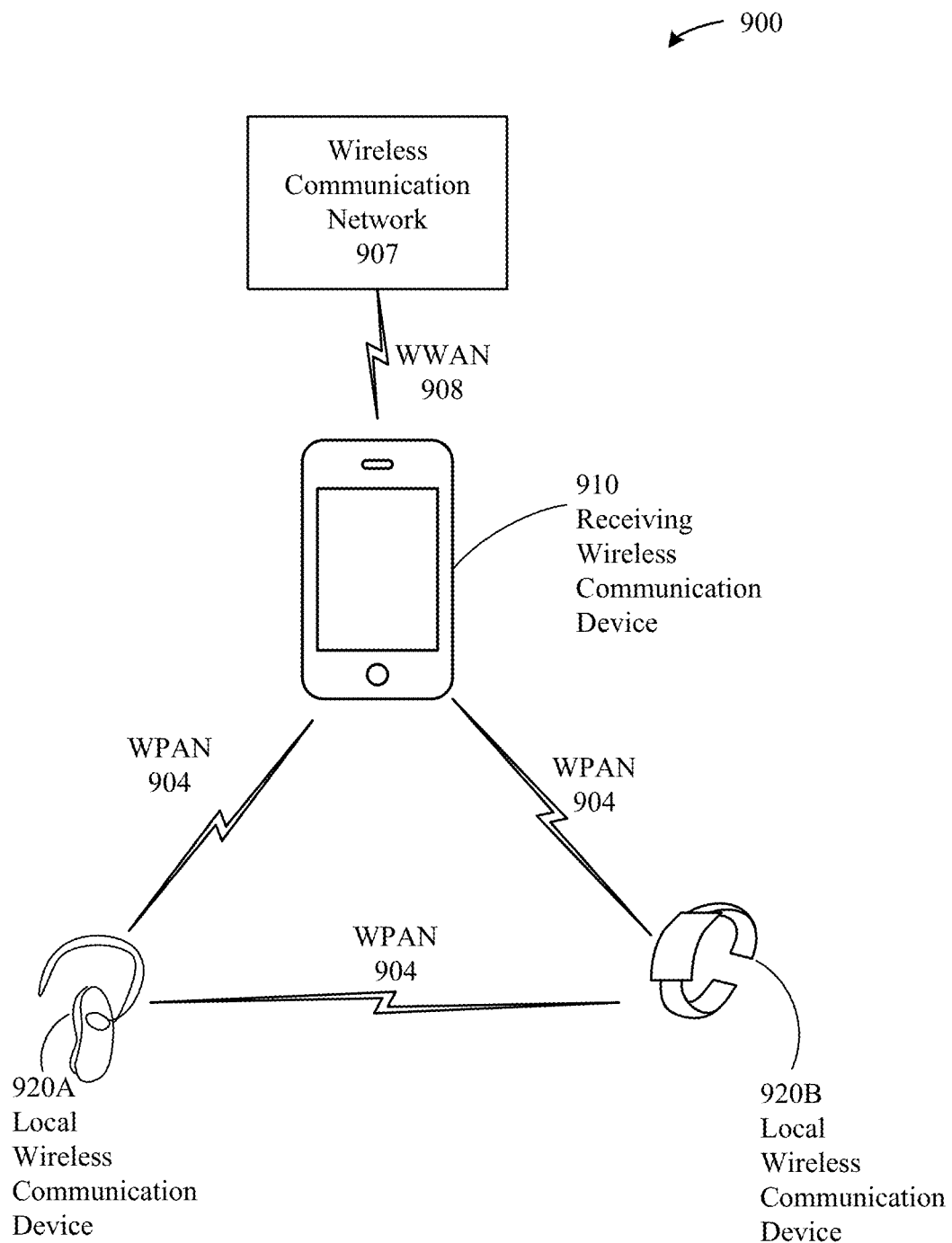
FIG. 9 illustrates in block diagram format an alternative exemplary system of wireless networks and devices, according to various embodiments of the present disclosure.

Transitioning now to FIG. 9, an alternative exemplary system of wireless networks and devices according to various embodiments of the present disclosure is illustrated in block diagram format. System 900 can include a receiving wireless communication user device 910 that can be interconnected through several different wireless communication technologies to an external set of networks and to two peripheral or associated local wireless communication user devices 920A and 920B. The user device 910 can be a "central" device for WPAN purposes, and can receive information from one or more packet switched networks and/or from one or more circuit switched networks, which is simply represented as a WWAN connection 908 provided through a wireless communication network 907. It will be appreciated that this can include more than one network, and that WWAN connection 908 can be used to access a broad variety of services (e.g., voice calls, text messages, data access, video calls, multimedia messaging, and media streaming). In addition, the user device 910 can use one or more WPAN connections 904 to peripheral or associated local wireless communication user devices 920A and 920B. These user devices 920A and 920B may also be in communication with each other, such as using a WPAN connection 904, which can be a Bluetooth® connection, for example.

In various embodiments, one or more of the user devices 910, 920A, 920B can include a processor, a memory, and a connection manager, among other possible components. The processor can be configured to implement the connection manager on a given user device, and the connection manager can be configured to manage outside connections for the user device and the other associated user devices. It will be understood that various connection functions that are or can be performed by a given user device can actually be performed by the connection manager for that user device. In some embodiments, one or more of the user devices 910, 920A, 920B can be wirelessly paired or otherwise grouped or associated with all of the other user devices 910, 920A, 920B. For example, user device 910 can be a smart phone or other communications device that is wirelessly paired with both of user devices 920A and 920B.

In various embodiments, the connection manager on a given user device 910, 920A, 920B can serve to route connections between the user devices. For purposes of discussion, user device 910 can be a "central" wireless user device that receives outside connections, such that its connection manager can serve to route these connections and perform other connection related functions for all of the user devices 910, 920A, and 920B. In some arrangements, user device 910 (e.g., its connection manager), can be adapted to receive outside connections, to receive signals regarding various statuses of one or both of user devices 920A and 920B, to route connections accordingly between the various user devices 910, 920A, and 920B, to detect changes in the statuses of one or both of user devices 920A and 920B, and to reroute connections accordingly between the various user devices 910, 920A, and 920B.

Each of the peripheral or associated wireless communication user devices 920A and 920B illustrated in FIG. 9 can provide output display capabilities as well as input response capabilities to allow a user of the user device 910 to interact with various services or otherwise relay connections or communications therethrough, such as through one or both of WPAN connections 904. For example, either of local wireless communication user devices 920A or 920B can provide call relay functionality for an incoming phone call or other connection to user device 910, such that the user can accept an incoming call or other connection at any of user devices 910, 920A, or 920B. In one specific non-limiting embodiment, user device 910 can be a smart phone, user device 920A can be a wireless headset and/or earbuds, and user device 920B can be an electronic watch device or other such "wearable." Accordingly, an incoming connection can be a telephone call. Of course, other types and arrangements of wireless communication devices can be used, and that fewer or more than two peripheral or associated user devices 920A, 920B can be local wireless communication user devices that are used with user device 910. As another example, one of the peripheral or associated user devices 920A, 920B can be a vehicle sound system.

In one specific non-limiting example, a status for a wireless headset (e.g., user device 920A) can dependent upon whether or not the wireless headset or at least a portion thereof is being worn by the user. For example, a status for a wireless headset can be "active" when an earbud or earpiece is in the ear of the user, and "inactive" when the earbud or earpiece is not in the ear of the user. As another example, an active/inactive status for a vehicle sound system can be dependent upon whether or not the vehicle electrical system is turned on. As yet another example, a particular status for a peripheral or associated user device 920A, 920B can be determined with respect to a user input, such as by a button press or voice command. A routing or rerouting function performed by a connection manager can then depend upon one or more of these various device statuses. For example, when a wireless headset or an earbud or earpiece thereof is being worn by the user, then the connection manager can determine or detect this status and route an outside connection accordingly. If the wireless headset is being worn by the user, then the connection can be routed to the "active" headset, but if the wireless headset is not being worn by the user, then the connection can be routed to the watch or other user device.

Figure 10:
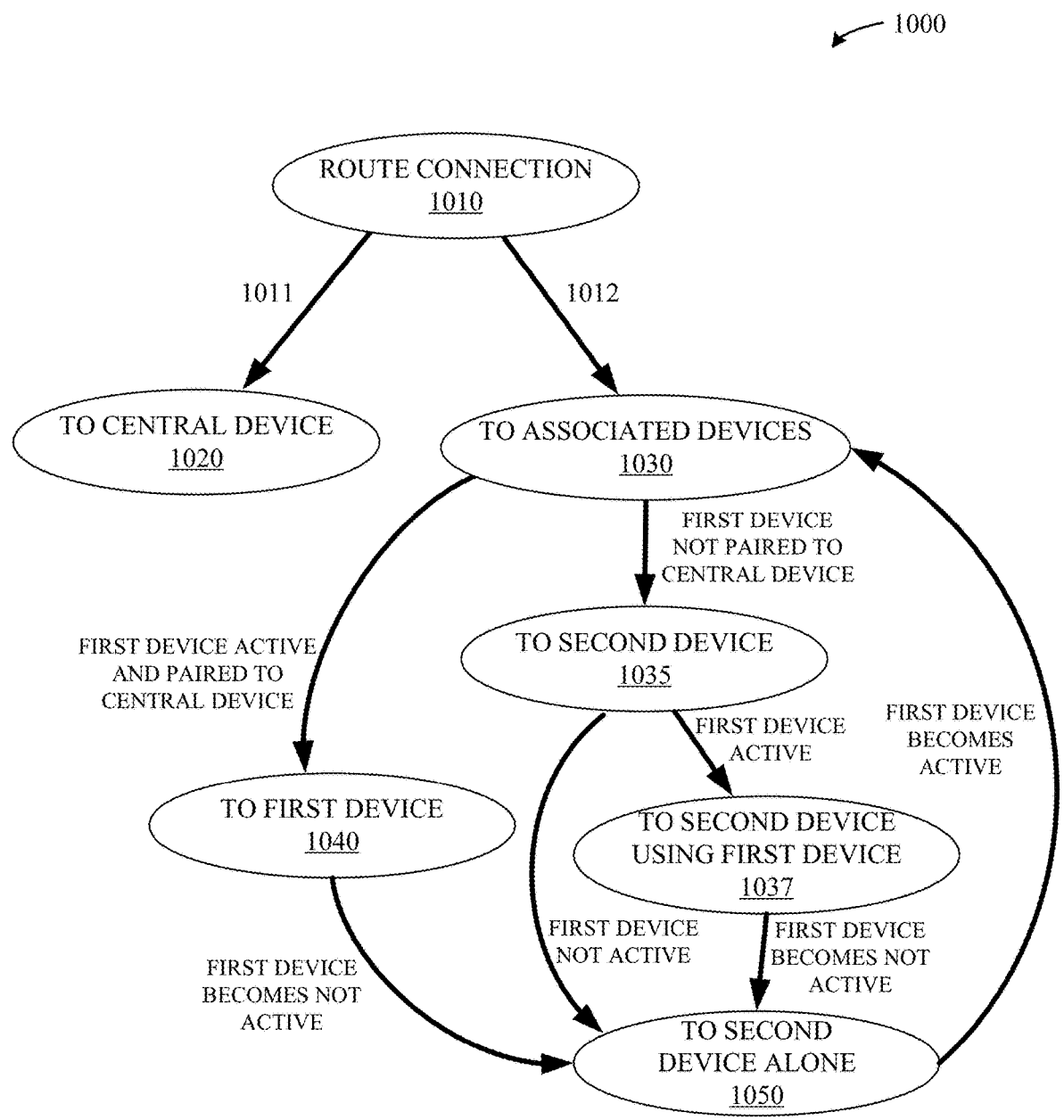
FIG. 10 illustrates a state diagram of exemplary states and transitions for the system of FIG. 9, according to various embodiments of the present disclosure.

FIG. 10 illustrates a state diagram of exemplary states and transitions for the system of FIG. 9 according to various embodiments of the present disclosure. State system 1000 can include an initial state 1010, such as where an outside connection is to be routed to one of the various associated user devices. The outside connection can be an incoming connection, such as a telephone call, or it can be a connection that is being initiated by one of the associated user devices. At this initial state 1010, a determination can be made as to whether the connection is to be handled by the central user device (e.g., user device 910) or at the set of associated user devices (e.g., user devices 920A and 920B). Determination 1011 can be for the connection to be handled at the main or central user device, upon which that central user device then takes the connection at state 1020. Conversely, determination 1012 can be for the connection to be handled at the set of associated user devices, upon which state 1030 can be entered.

State 1030 can involve a determination as to whether a first associated user device is currently paired with the central user device and whether the status of the first associated user device is active. For example, such a status can be active when the first associated user device is a wireless headset that is being worn by the user. In the case that the wireless headset (i.e., first associated user device) is active and is paired with the smart phone or other central user device, then the connection can be routed to state 1040, where the connection is answered by the central user device and routed to the active and paired first associated user device. If the status is not active and paired, however, then state 1035 is accessed, where a determination is made as to whether the first associated user device is active but not paired with the central user device. If that is the case, then state 1037 is accessed, but if the first associated user device is determined not to be active at all, then state 1050 is accessed.

At either of states 1037 or 1050, the connection can be routed to the second associated user device, which again can be an electronic watch or other suitable wireless communications adapted user device. At state 1037, the second associated user device can handle the routed connection and communicate with the active first associated user device as its accessory device for the user. At state 1050, the second associated user device can handle the routed connection on its own for the user.

At state 1040, an event can involve a change in status for the first associated user device. A similar event can apply for state 1037. Each of these events can involve, for example, the user taking off the wireless headset, which then changes the status from active to not active. This then results in state 1050 being achieved. From state 1040, this can involve the connection being rerouted from the wireless headset or other first associated communication device to the watch or other second associated communication device. From state 1037, this can involve the second associated user device no longer using the first associated user device as its accessory to handle the connection.

At state 1050, an event can similarly involve a change in status for the first associated user device, such as where the first associated user device goes from not active to active. For example, this can include the user putting the wireless headset on (or the earbud or earpiece in his or her ear), upon which state 1030 is then achieved. This can then revert back to the set of inquiries as to whether to reroute the connection to the first associated user device, such as to arrive at state 1040, or to arrive at state 1037 in the event that the first associated user device is not or remains unpaired with the central user device. The various states in state system 1000 can then continue according to the statuses of the first associated user device, which can change over time. Various other statuses can also be used to determine a state change. For example, a user input at any of the central user device or the associated user devices can push or pull the connection from one user device to another, such as at states 1040 or 1050. Such user inputs can also push or pull the connection back to the central user device, such as at state 1020.

Figure 11:
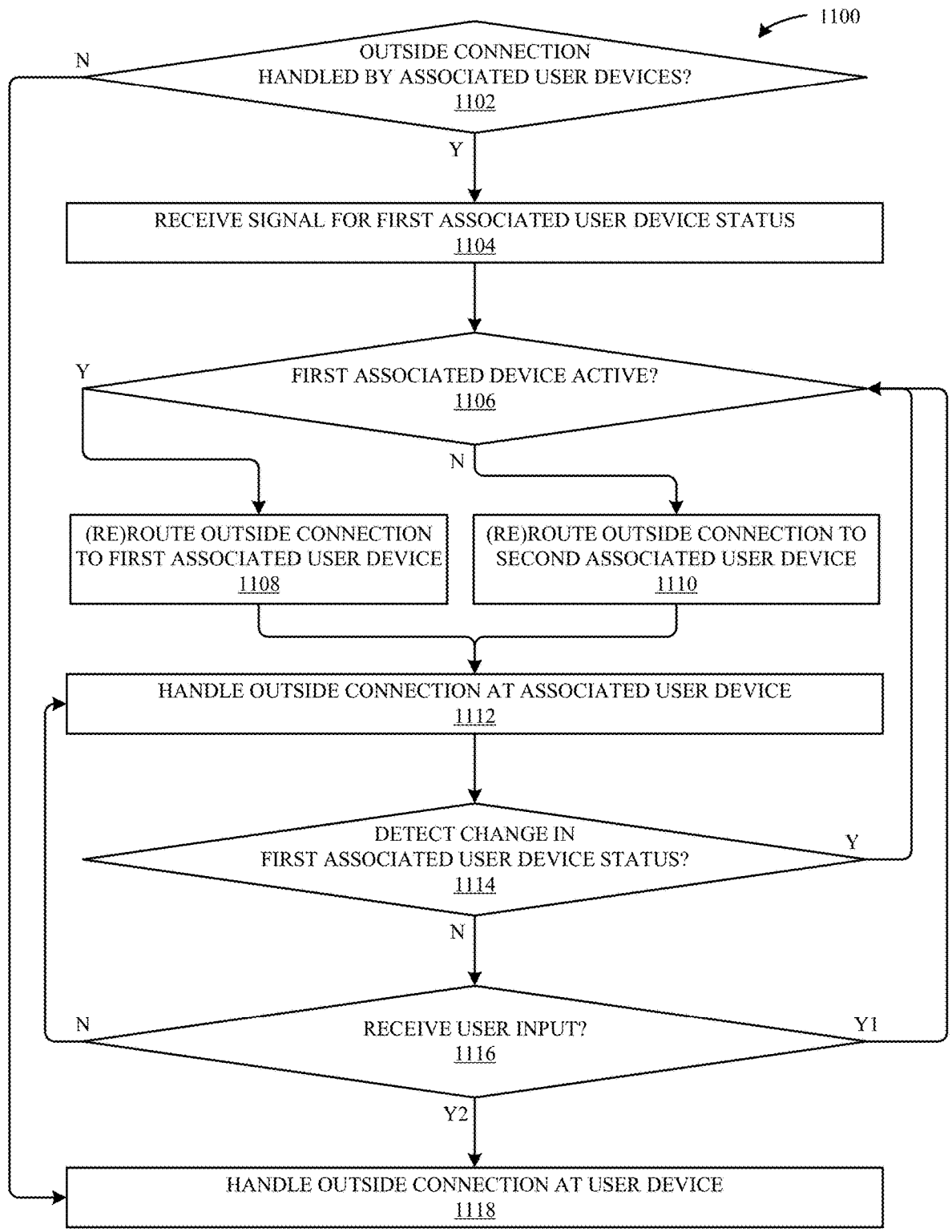
FIG. 11 illustrates a flowchart of an exemplary method performed by a connection manager on a user device for managing outside connections for the user device and a set of associated user devices, according to various embodiments of the present disclosure.

FIG. 11 illustrates a flowchart of an exemplary method performed by a connection manager on a user device for managing outside connections for the user device and a set of associated user devices according to various embodiments of the present disclosure. Again, the connection manager can be located on a central user device, such as where outside connections are to be managed for the central user device and one or more associated user devices. Method 1100 can start at a decision step 1102, where the connection manager determines whether an outside connection is to be handled by the associated user devices. If not, then the method skips to step 1118, where the outside connection is handled at the central user device itself. If the outside connection is to be handled by the associate user devices, however, then the method continues to step 1104.

At step 1104, the connection manager can receive a signal for the status of a first associated user device, whereupon the connection manager can determine whether the first associated user device is active or not at decision step 1106. If the first associated user device is active, then the connection manager can route the connection to the first associated user device at step 1108. If the first associated user device is not active, however, then the connection manager can route the connection to the second associated user device at step 1110.

At subsequent step 1112, the outside connection can then be handled at the respective associated user device to which it has been routed. At decision step 1114, the connection manager can determine whether a change in the status of the first associated user device has been detected. If so, then the method can revert to decision step 1106 so that the connection can be rerouted to the other associated user device at the appropriate step 1108 or 1110. If not, then the method can continue to decision step 1116.

At decision step 1116, the connection manager can determine whether a user input has been received. If not, then the method can revert to step 1112, where the connection can continue to be handled by the associated user device to which it has been routed. If a user input has been received at step 1116, however, then the method can continue to either of step 1106 or step 1118. Where the user input requires a push or a pull to the other associated user device, then the method reverts back to step 1106 so that the connection can be rerouted accordingly at step 1108 or 1110. Where the user input requires a push or a pull back to the central user device, however, then the method continues to step 1118, where this can take place.

For each of the foregoing flowcharts, it will be readily appreciated that not every step provided is always necessary, and that further steps not set forth herein may also be included. For example, added steps that involve specific time determinations for given commands or alerts to be broadcast may be added. Also, steps that provide more detail with respect to various system components or features could also be added. Furthermore, the exact order of steps may be altered as desired, and some steps may be performed simultaneously.

Figure 12:
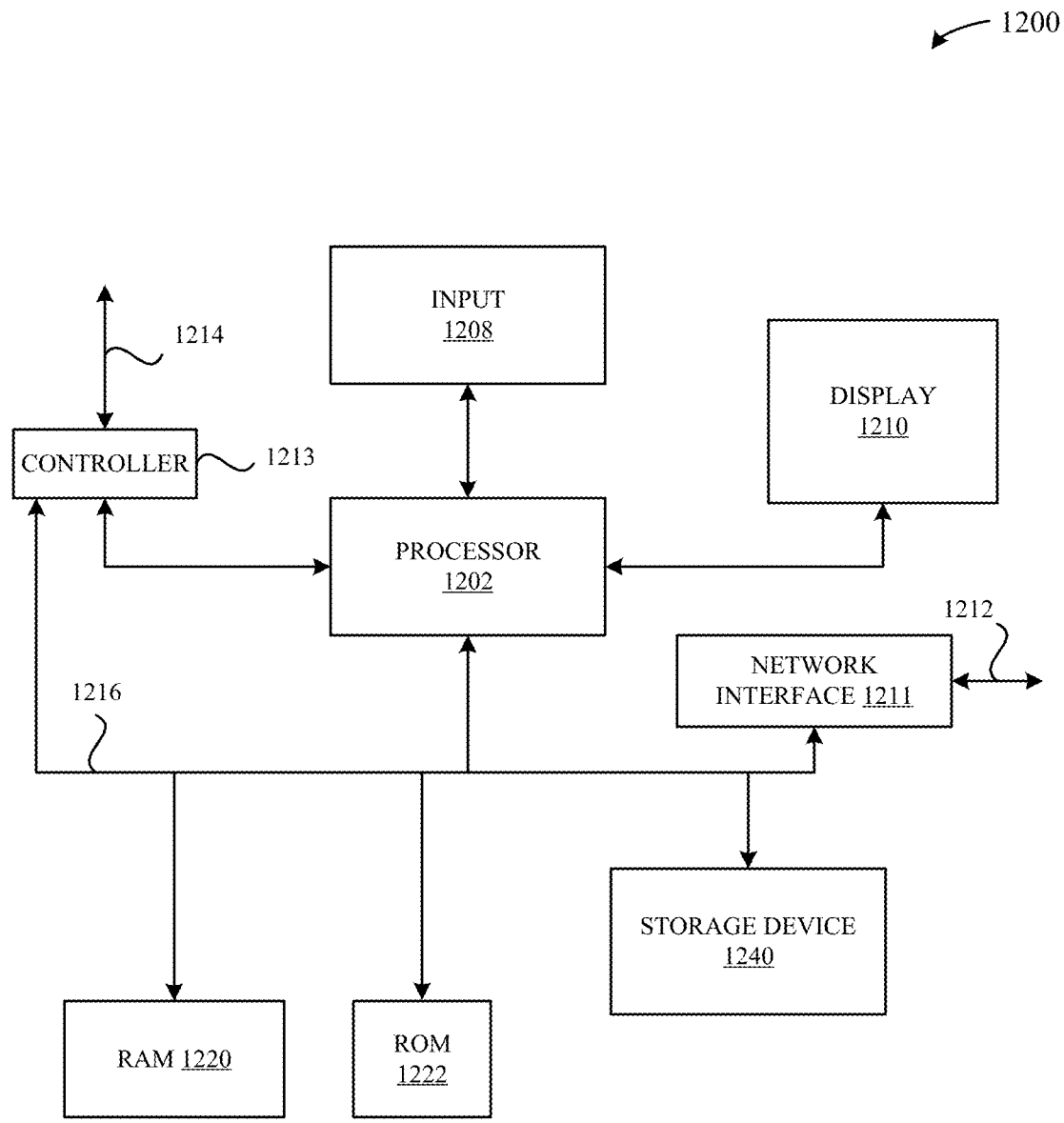
FIG. 12 illustrates in block diagram format an exemplary computing device that can be used to implement the various components and techniques described herein, according to various embodiments of the present disclosure.

FIG. 12 illustrates in block diagram format an exemplary computing device 1200 that can be used to implement the various components and techniques described herein, according to some embodiments. In particular, the detailed view illustrates various components that can be included in the user device 110 illustrated in FIG. 1. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, caller ID or other information relating to a current telephone call). A data bus 1216 can facilitate data transfer between at least a storage device 1240, the processor 1202, and a controller 1213. The controller 1213 can be used to interface with and control different equipment through and equipment control bus 1214. The computing device 1200 can also include a network/bus interface 1211 that couples to a data link 1212. In the case of a wireless connection, the network/bus interface 1211 can include a wireless transceiver.

The computing device 1200 also include a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

Some embodiments provide a method for managing connections performed by a processor on a user device. During the method, the user device may generate a silencing command when an incoming connection has been answered at the user device, where each of the user device and one or more associated user devices is adapted to answer the incoming connection. Then, the user device may transmit the silencing command using a first mode of communication to the one or more associated user devices. Moreover, the user device may transmit the silencing command using a second mode of communication to the one or more associated user devices, where the second mode of communication differs from the first mode of communication such that the silencing command transmitted using the second mode of communication incurs less delay than the silencing command transmitted using the first mode of communication.

Note that the incoming connection may be a voice call.

Moreover, the first mode of communication may define an indirect communication path from the user device to the one or more associated user devices, and the second mode of communication may define a direct communication path from the user device to the one or more associated user devices. For example, the first mode of communication may include a wirelessly transmitted push message that communicates via a network based server before reaching the one or more associated user devices, and the second mode of communication may include a wirelessly transmitted BTLE advertisement.

Furthermore, a transmittal time using the second mode of communication may be less than 200 milliseconds.

Additionally, before generating the silencing command, the user device may: receive a notification indicating the incoming connection; instruct one or more output components of the user device to provide an alert indicating the incoming connection; and listen for communications from the one or more associated user devices using both the first mode of communication and the second mode of communication. In some embodiments, the user device: receives an incoming silencing command from one of the one or more associated user devices using the first mode of communication, the second mode of communication, or both; and instructs the one or more output components to stop providing the alert indicating the incoming connection after receiving the incoming silencing command. Note that the user device may receive the incoming silencing command in response to the incoming connection being answered at one of the one or more associated user devices.

Moreover, the user device may: determine whether any of the one or more associated user devices is currently active; and limit the alert to visual alerts when one of the one or more associated user devices is currently active.

Furthermore, the user device may determine whether the user device answers the incoming connection.

Additionally, each of the user device and the one or more associated user devices may be selected from a group that includes: a smart phone, a tablet device, a wearable device, a portable media player, a laptop computer, and/or a desktop computer.

Another embodiment provides the user device that manages outside connections. This user device may include a processor that implements a connection manager, which may perform at least some of the aforementioned operations in the method. During operation, the connection manager may determine whether the user device answers an incoming outside connection, where each of the user device and one or more associated user devices is adapted to answer the incoming outside connection. Then, the connection manager may generate a silencing command when the incoming outside connection has been answered at the user device. Moreover, the connection manager may transmit the silencing command using a first mode of communication to the one or more associated user devices, and may transmit the silencing command using a second mode of communication to the one or more associated user devices. Note that the second mode of communication may differ from the first mode of communication such that the silencing command transmitted using the second mode of communication incurs less delay than the silencing command transmitted using the first mode of communication.

Another embodiment provides a non-transitory computer readable storage medium configured to store instructions that, when executed by a processor included in a user device, cause the user device to implement a connection manager. The connection manager may perform at least some of the aforementioned operations in the method. During operation the connection manager may receive a notification indicating an incoming connection, where each of the user device and one or more associated user devices is adapted to answer the incoming connection. Then, the connection manager may listen for communications from the one or more associated user devices using both a first mode of communication and a second mode of communication, where the second mode of communication differs from the first mode of communication such that a communication transmitted using the second mode of communication incurs less delay than the communication transmitted using the first mode of communication. Moreover, the connection manager may determine whether any of the one or more associated user devices is currently active. Furthermore, the connection manager may instruct one or more output components of the user device to provide an alert indicating the incoming connection, where the alert is limited to visual alerts when one of the one or more associated user devices is currently active. Next, the connection manager may determine whether the user device answers the incoming connection. When the user device answers the incoming connection, the connection manager may: generate a silencing command; transmit the silencing command using the first mode of communication to the one or more associated user devices; and transmit the silencing command using the second mode of communication to the one or more associated user devices. Otherwise, the connection manager may: receive an incoming silencing command from one of the one or more associated user devices using the first mode of communication, the second mode of communication, or both; and instruct the one or more output components to stop providing the alert indicating the incoming connection after receiving the incoming silencing command.

Another embodiment provides a system that includes the user device.

Some embodiments provide a user device that manages outside connections. This user device may include a processor that implements a connection manager. During operation, the connection manager may receive a signal regarding the status of a first associated user device. Then, the connection manager may route an outside connection from the user device to the first associated user device over a wireless mode of communication when the status of the first associated user device is active. Otherwise, the connection manager may route the outside connection from the user device to a second associated user device. Next, the connection manager may detect a change in the status of the first associated user device after the outside connection has been routed to the first associated user device or the second associated user device. Moreover, the connection manager may reroute the outside connection from one of the first associated user device and the second associated user device to the other of the first associated user device and the second associated user device over the wireless mode of communication when a change in the status of the first associated user device is detected.

Note that the outside connection may be a telephone call. Moreover, the user device may be a smart phone. Furthermore, the first associated user device may be a headset. The headset status may be active when at least a portion of the headset is being worn by the user. Additionally, the second associated user device may be a watch.

In some embodiments, the connection manager: receives an input made by the user on the second associated user device; and reroutes the outside connection from one of the first associated user device and the second associated user device to the other of the first associated user device and the second associated user device over the wireless mode of communication when the input is received.

Moreover, the first associated user device may be a vehicle sound system.

Furthermore, the wireless mode of communication may include a Bluetooth® connection.

Additionally, the connection manager may determine whether the outside connection is to be handled for a user at the user device or at the set of associated user devices.

Note that the headset status may be active when at least a portion of the headset is being worn by the user.

Furthermore, the connection manager may: receive an input made by the user on the user device, the first associated user device, or the second associated user device; and reroute the outside connection from one of the first associated user device and the second associated user device back to the user device when the input is received.

Additionally, the connection manager may determine whether the outside connection is to be handled for a user at the user device or at the set of associated user devices.

Another embodiment provides a method performed by a connection manager for managing connections on a user device. This method may include at least some of the aforementioned operations performed by the user device. For example, during the method, the connection manager may route an outside connection from the user device to a first associated user device when a status of the first associated user device comprises a first status. Otherwise, the connection manager may route the outside connection from the user device to a second associated user device. Then, the connection manager may detect a change in the status of the first associated user device after the outside connection has been routed to the first associated user device or the second associated user device. Moreover, the connection manager may reroute the outside connection from one of the first associated user device and the second associated user device to the other of the first associated user device and the second associated user device when a change in the status of the first associated user device is detected.

Another embodiment provides a non-transitory computer readable storage medium configured to store instructions that, when executed by a processor included in a user device, cause the user device to implement a connection manager that to manages outside connections for the user device and a set of associated user devices. The connection manager may perform at least some of the aforementioned operations in the method. During operation the connection manager may. receive a signal regarding the status of a first associated user device. Then, the connection manager may route an outside connection from the user device to the first associated user device over a wireless mode of communication when the status of the first associated user device is active. Otherwise, the connection manager may route the outside connection from the user device to a second associated user device. Moreover, the connection manager may detect a change in the status of the first associated user device after the outside connection has been routed to the first associated user device or the second associated user device. Next, the connection manager may reroute the outside connection from one of the first associated user device and the second associated user device to the other of the first associated user device and the second associated user device over the wireless mode of communication when a change in the status of the first associated user device is detected.

Another embodiment provides a system that includes the user device.

Another embodiment provides the user device that manages outside connections. This user device may include a processor that implements a connection manager. During operation, the connection manager receives an incoming connection alert associated with an incoming connection. Then, the connection manager determines when the incoming connection is answered at the user device or one or more associated user device, where the one or more associated user devices are capable of answering the incoming connection. Moreover, the connection manager generates a silencing command based on the determination. Next, the connection manager transmits the silencing command to the one or more associated user devices using a first mode of communication.

Note that the first mode of communication may include wireless communication having a range less than a predefined value. For example, the first mode of communication may include a Bluetooth alert or a Bluetooth advertisement.

Moreover, the transmitting may involve broadcasting the silencing command to the one or more associated user devices.

Furthermore, the connection manager may transmit the silencing command to the one or more associated user devices using a second mode of communication that is different from the first mode of communication. For example, the second mode of communication may have a transmittal time that is longer than the first mode of communication. In particular, the second mode of communication may include a push message.

Additionally, the silencing command may is included in a call answer notification.

In some embodiments, the connection manager transmits a call answer notification that indicates that the incoming connection has been answered.

Moreover, the connection manager may receive another call answer notification from one of the one or more associated user devices.

Furthermore, the silencing command may instruct separate connection managers located on the one or more associated user devices to stop providing incoming connection alerts about the incoming connection.

Another embodiment provides a method performed by a connection manager for managing connections on a user device. This method may include at least some of the aforementioned operations performed by the user device.

Another embodiment provides a non-transitory computer readable storage medium configured to store instructions that, when executed by a processor included in a user device, cause the user device to implement a connection manager that to manages outside connections for the user device and a set of associated user devices. The connection manager may perform at least some of the aforementioned operations in the method.

Another embodiment provides a system that includes the user device.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. At least one non-transitory computer readable storage medium storing instructions that, when executed by at least one processor included in a user device, cause the user device to manage connection alerts, by carrying out steps that include:
   receiving an incoming connection alert for an incoming connection;
   answering the incoming connection; and
   transmitting, to a second user device associated with the user device, a silencing command to notify the second user device to stop providing an alert for the incoming connection, wherein the user device and the second user device are each registered together at an accessible server with a registered and grouped device arrangement.

2. The at least one non-transitory computer readable storage medium of claim 1, wherein execution of the instructions causes the user device to transmit the silencing command to the second user device via a wireless personal area network (WPAN).

3. The at least one non-transitory computer readable storage medium of claim 2, wherein the silencing command is included in a WPAN advertisement message.

4. The at least one non-transitory computer readable storage medium of claim 2, wherein execution of the instructions causes the user device to transmit the silencing command to the second user device by broadcasting a WPAN message.

5. The at least one non-transitory computer readable storage medium of claim 1, wherein execution of the instructions causes the user device to transmit the silencing command to the second user device via two different parallel modes of communication.

6. The at least one non-transitory computer readable storage medium of claim 1, wherein execution of the instructions causes the user device to transmit the silencing command to the second user device using a push message communicated via a server.

7. The at least one non-transitory computer readable storage medium of claim 1, wherein the silencing command is included in a call answer notification.

8. The at least one non-transitory computer readable storage medium of claim 1, wherein execution of the instructions further causes the user device to:
   stop providing an alert for the incoming connection at the user device responsive to a determination that the incoming connection is answered at the second user device.

9. The at least one non-transitory computer readable storage medium of claim 8, wherein execution of the instructions causes the user device to determine that the incoming connection is answered at the second user device based at least in part on receipt of a call answer notification from the second user device.

10. A method for managing connection alerts, the method comprising, at a user device:
   receiving an incoming connection alert for an incoming connection;
   answering the incoming connection; and
   transmitting, to a second user device associated with the user device, a silencing command to notify the second user device to stop providing an alert for the incoming connection, wherein the user device and the second user device are each registered together at an accessible server with a registered and grouped device arrangement.

11. The method of claim 10, wherein the user device transmits the silencing command via a wireless personal area network (WPAN).

12. The method of claim 10, wherein the user device transmits the silencing command using a push message communicated via a server.

13. The method of claim 10, wherein the user device transmits the silencing command via two different parallel modes of communication.

14. The method of claim 10, wherein the user device transmits the silencing command using a broadcast message.

15. The method of claim 14, wherein the broadcast message comprises a wireless personal area network (WPAN) advertisement message.

16. The method of claim 14, wherein the silencing command is included in a call answer notification.

17. A user device configured to manage connection alerts, the user device comprising:
   a network interface;
   a processor; and
   a memory storing instructions that, when executed by the processor, cause the user device to:
      receive an incoming connection alert for an incoming connection;
      answer the incoming connection; and
      transmit, to a second user device associated with the user device, a silencing command to notify the second user device to stop providing an alert for the incoming connection, wherein the user device and the second user device are each registered together at an accessible server with a registered and grouped device arrangement.

18. The user device of claim 17, wherein the user device transmits the silencing command via two different parallel modes of communication.

19. The user device of claim 18, wherein one of the two different parallel modes of communication comprises a wireless personal area network (WPAN).

20. The user device of claim 18, wherein one of the two different parallel modes of communication comprises use of a push message communicated via a server.

\* \* \* \* \*